United States Patent
Haag

(10) Patent No.: US 10,629,320 B2
(45) Date of Patent: Apr. 21, 2020

(54) METHOD FOR PRODUCING SULFUR CHARGED CARBON NANOTUBES AND CATHODES FOR LITHIUM ION BATTERIES

(71) Applicant: MSMH, LLC, Des Plaines, IL (US)

(72) Inventor: Michael Allen Haag, Boulder, CO (US)

(73) Assignee: MSMH, LLC, Des Plaines, IL (US)

( * ) Notice: Subject to any disclaimer, the term of this patent is extended or adjusted under 35 U.S.C. 154(b) by 201 days.

(21) Appl. No.: 15/311,485

(22) PCT Filed: May 15, 2015

(86) PCT No.: PCT/US2015/031234
§ 371 (c)(1),
(2) Date: Nov. 15, 2016

(87) PCT Pub. No.: WO2015/176028
PCT Pub. Date: Nov. 19, 2015

(65) Prior Publication Data
US 2017/0084960 A1  Mar. 23, 2017

Related U.S. Application Data

(60) Provisional application No. 61/993,840, filed on May 15, 2014, provisional application No. 61/993,870, filed on May 15, 2014.

(51) Int. Cl.
*H01B 1/04* (2006.01)
*C01B 32/174* (2017.01)
(Continued)

(52) U.S. Cl.
CPC .............. *H01B 1/04* (2013.01); *C01B 32/174* (2017.08); *C01B 32/178* (2017.08);
(Continued)

(58) Field of Classification Search
CPC .... H01B 1/04; H01B 1/06; H01B 1/10; C01B 32/174; C01B 32/178; C01B 2202/10;
(Continued)

(56) References Cited

U.S. PATENT DOCUMENTS 6,080,232 A    6/2000  Sperlich et al.
7,811,543 B2   10/2010 Didenko et al.
(Continued)

FOREIGN PATENT DOCUMENTS

CN    201382691 Y    1/2010
EP      1930063 A1   6/2008
(Continued)

OTHER PUBLICATIONS

Characteristics and Properties of Single and Multi Walled Carbon Nanotubes (webpage obtained from https://www.azonano.com/article.aspx?ArticleID=1560) (Year: 2006).*

(Continued)

*Primary Examiner* — Matthew R Diaz
(74) *Attorney, Agent, or Firm* — Dorsey & Whitney LLP

(57) ABSTRACT

A method for making sulfur charged carbon nanotubes, the structure of the sulfur charged carbon nanotubes, and a cathode including the sulfur charged carbon nanotubes are described herein. The method comprises dissolving sublimed sulfur in a solvent to create a solution. The method further comprises adding carbon nanotubes to the solution. The method further comprises adding a polar protic solvent to the solution. The method further comprises removing the solvent from the solution.

14 Claims, 16 Drawing Sheets

(51) Int. Cl.

| | | |
|---|---|---|
| *C01B 32/178* | (2017.01) | |
| *H01M 4/1397* | (2010.01) | |
| *H01M 4/36* | (2006.01) | |
| *H01M 4/62* | (2006.01) | |
| *H01M 10/0525* | (2010.01) | |
| *H01M 4/58* | (2010.01) | |
| *B82Y 30/00* | (2011.01) | |
| *B82Y 40/00* | (2011.01) | |

(52) U.S. Cl.
CPC ........ *H01M 4/1397* (2013.01); *H01M 4/362* (2013.01); *H01M 4/366* (2013.01); *H01M 4/5815* (2013.01); *H01M 4/625* (2013.01); *H01M 10/0525* (2013.01); *B82Y 30/00* (2013.01); *B82Y 40/00* (2013.01); *C01B 2202/10* (2013.01); *C01P 2004/02* (2013.01); *C01P 2006/40* (2013.01); *Y10S 977/744* (2013.01); *Y10S 977/846* (2013.01); *Y10S 977/948* (2013.01)

(58) Field of Classification Search
CPC .... H01M 4/133; H01M 4/136; H01M 4/1393; H01M 4/1397; H01M 4/362; H01M 4/366; H01M 4/5815; H01M 4/583; H01M 4/624; H01M 4/625; H01M 10/0525; B82Y 40/00
See application file for complete search history.

(56) References Cited

U.S. PATENT DOCUMENTS

| | | | |
|---|---|---|---|
| 8,388,725 B2 | 3/2013 | Lee et al. | |
| 8,609,183 B2* | 12/2013 | Wang | H01M 4/38 427/113 |
| 8,663,840 B2* | 3/2014 | Nazri | H01M 4/0423 429/209 |
| 8,865,574 B2 | 10/2014 | Haag | |
| 9,601,748 B2 | 3/2017 | Haag | |
| 2002/0037451 A1 | 3/2002 | Eguchi et al. | |
| 2004/0146784 A1 | 7/2004 | Gao et al. | |
| 2005/0272214 A1 | 12/2005 | Chiang et al. | |
| 2007/0099330 A1 | 5/2007 | Kodas et al. | |
| 2007/0111319 A1 | 5/2007 | Bastide et al. | |
| 2007/0255002 A1 | 11/2007 | Alba | |
| 2008/0041446 A1 | 2/2008 | Wu et al. | |
| 2008/0067618 A1 | 3/2008 | Wang et al. | |
| 2008/0254362 A1 | 10/2008 | Raffaelle et al. | |
| 2008/0274036 A1 | 11/2008 | Resasco et al. | |
| 2009/0114275 A1 | 5/2009 | Zaban et al. | |
| 2009/0205181 A1 | 8/2009 | Koizumi et al. | |
| 2009/0317504 A1 | 12/2009 | Rajala et al. | |
| 2010/0120179 A1 | 5/2010 | Zhamu et al. | |
| 2010/0148144 A1 | 6/2010 | Britton et al. | |
| 2010/0152468 A1* | 6/2010 | Kansal | C07D 307/77 549/458 |
| 2010/0173198 A1 | 7/2010 | Zhamu et al. | |
| 2010/0231095 A1 | 9/2010 | Kubota et al. | |
| 2010/0265307 A1 | 10/2010 | Linton et al. | |
| 2011/0049415 A1 | 3/2011 | Lee et al. | |
| 2011/0163636 A1 | 7/2011 | Sirbuly et al. | |
| 2012/0264017 A1 | 10/2012 | Nazri et al. | |
| 2013/0045427 A1 | 2/2013 | Wang et al. | |
| 2013/0130116 A1 | 5/2013 | Ryu et al. | |
| 2013/0164626 A1* | 6/2013 | Manthiram | B82Y 30/00 429/231.8 |
| 2013/0171355 A1* | 7/2013 | Wang | H01M 4/38 427/337 |
| 2013/0202961 A1* | 8/2013 | Hagen | H01M 4/0404 429/211 |
| 2013/0271085 A1 | 10/2013 | Chen et al. | |

FOREIGN PATENT DOCUMENTS

| | | |
|---|---|---|
| EP | 2091091 A2 | 8/2009 |
| JP | 2013137981 A | 7/2013 |
| WO | 2007/015250 A2 | 2/2007 |
| WO | 2010/014979 A1 | 2/2010 |
| WO | 2012075011 A2 | 6/2012 |
| WO | 2013052456 A1 | 4/2013 |

OTHER PUBLICATIONS

Carbon disulfide safety data sheet (Sigma-Aldrich, version 5.2) (Year: 2014).*
Boccaccini et al., "Electrophoretic deposition of carbon nanotubes", Carbon. vol. 44, Issue 15, 2006, pp. 3149-3160.
International Search Report and Written Opinion, International application PCT/US2015/031234 dated Aug. 18, 2015, 7 Pages.
Kennedy, Tadhg et al., "High-Performance Germanium Nanowire-Based Lithium-Ion Battery Anodes Extending over 1000 Cycles Through in Situ Formation-of a Continuous Porous Network", American Chemical Society, Nano Lett., 14(2), pp. 716-723, 2014, A-H.
Klavetter, Kyle C. et al., "A high-rate germanium-particle slurry cast Li-ion with high Coulombic efficiency and long cycle life", J. of Power Sources, 238, 2013, pp. 123-136.
Mayer, "Future of electrotechnics: ferrofluids", Advances in electrical and electronic engineering, 2008, pp. 9-14.
Office Action for Canadian Patent Application No. 2,949,100, dated Dec. 28, 2017 (4 pages).
Extended European Search Report for European Patent Application No. 15792621.3, dated Jan. 22, 2018 (8 pages).
Ma et al., "Multiwalled carbon nanotubes—sulfur composites with enhanced electrochemical performance for lithium/sulfur batteries." Applied Surface Science, 2014, pp. 346-350, vol. 307.

* cited by examiner

METHOD FOR PRODUCING SULFUR CHARGED CARBON NANOTUBES AND CATHODES FOR LITHIUM ION BATTERIES

CROSS REFERENCE TO RELATED APPLICATIONS

This application is a national phase application under 35 U.S.C. § 371 of International Application No. PCT/US2015/031234 filed on May 15, 2015 entitled "Method for producing sulfur charged carbon nanotubes and cathodes for lithium ion batteries," which claims the benefit of priority pursuant to 35 U.S.C. § 119(e) of U.S. provisional application No. 61/993,840 filed 15 May 2014 entitled "Method for producing high energy capacity nanocrystal based anodes for lithium ion batteries," and U.S. provisional application No. 61/993,870 filed 15 May 2014 entitled "Method for producing sulfur charged carbon nano tube cathodes for Lithium ion batteries," each of which is hereby incorporated herein by reference in its entirety.

TECHNICAL FIELD

The present disclosure relates generally to Lithium-ion batteries, and more specifically to sulfur charged carbon nanotubes and cathodes for use in Lithium-Sulfur cells.

BACKGROUND

Lithium ion batteries have been proven to offer higher energy and power density, a wider range of operating temperatures, and excellent cycle and calendar life when compared to other battery chemistries. Continued demand for various portable electronics, such as electric hand and power tools, as well as high power applications of electric based transportation, continues to direct research to focus on lower cost materials without compromise of reliability and life of lithium ion batteries.

The information included in this Background section of the specification, including any references cited herein and any description or discussion thereof, is included for technical reference purposes only and is not to be regarded subject matter by which the scope of the invention as defined in the claims is to be bound.

SUMMARY

According to one embodiment, a method for making sulfur charged carbon nanotubes is described. The method comprises dissolving sublimed sulfur in a solvent to create a solution. The method further comprises adding carbon nanotubes to the solution. The method further comprises adding a polar protic solvent to the solution. The method further comprises removing the solvent from the solution.

According to another embodiment, a sulfur charged carbon nanotube is disclosed. The sulfur charged carbon nanotube comprises a carbon nanotube having an exterior wall, a first plurality of sulfur particles contained within the carbon nanotube, and a second plurality of sulfur particles bonded to the exterior wall of the carbon nanotube.

According to yet another embodiment, a cathode for use in a Lithium-Sulfur battery is described. The cathode may include an electrode and a film of sulfur charged carbon nanotubes bonded to the electrode by a binding agent. the sulfur charged carbon nanotubes comprise a plurality of carbon nanotubes having exterior walls, a first plurality of sulfur particles contained within the plurality of carbon nanotubes, and a second plurality of sulfur particles bonded to the exterior walls of the carbon nanotubes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

DETAILED DESCRIPTION

High-power and energy-dense lithium-ion batteries are desirable for portable electronics, electric vehicles, and peak power storage for increased life, range, and capacity. Improvements to lithium-ion cathodes and anodes are sought to increase storage capacity and the number of recharge cycles before structural breakdown.

Sulfur-Charged Carbon Nanotube Cathodes

The lithium-sulfur (Li—S) cell has become an attractive option for cathode architecture because of the high theoretical specific energy density of about 2600 Wh/kg (1672 mAh/g), assuming complete reaction to Li2S. Additionally, advancing lithium-sulfur energy (Li—S) storage cyclability (i.e., the number of times a battery can be recharged before dropping below 80% of its initial capacity) has the potential to substantially improve battery technology because of a high theoretical energy density (1672 mA h g$^{-1}$) of Li—S architecture for use in lithium-ion batteries. In addition to the high capacity, using sulfur as a cathode material has the advantages of high natural abundance and low cost while also being ecofriendly. In traditional Li—S architectures, low cyclability prevents the technology from being a commercially viable product. Recent advances in material technologies and applications with respect to electric vehicles have spurred new interest in Li—S systems.

Traditional Li—S battery systems have several drawbacks. First, elemental sulfur has poor electrical conductivity (5.0 e$^{-14}$ S*cm$^{-1}$). Second, polysulfides (Li$_2$S$_n$) may branch into the electrolyte solution between the anode and the cathode during cycling. If the polysulfides cross the separator between the anode and cathode and react with the lithium negative electrode, the amount of active sulfur in the cathode is reduced and subsequently cycling efficiency decreases with each cycle. Ultimately, the reduction in sulfur can cause the battery to short. Continuous reduction of the Li$_2$S$_n$ polysulfides by the Li anodes prevents the redox reaction back to elemental sulfur at the cathode side upon charging. This cyclic process is known as the "shuttle" phenomenon of Li—S sulfur systems and leads to a limited capacity much lower than the theoretical value of sulfur electrodes. Third, production of Li—S cathodes can result in unusable byproducts that increase waste.

Figure 1:
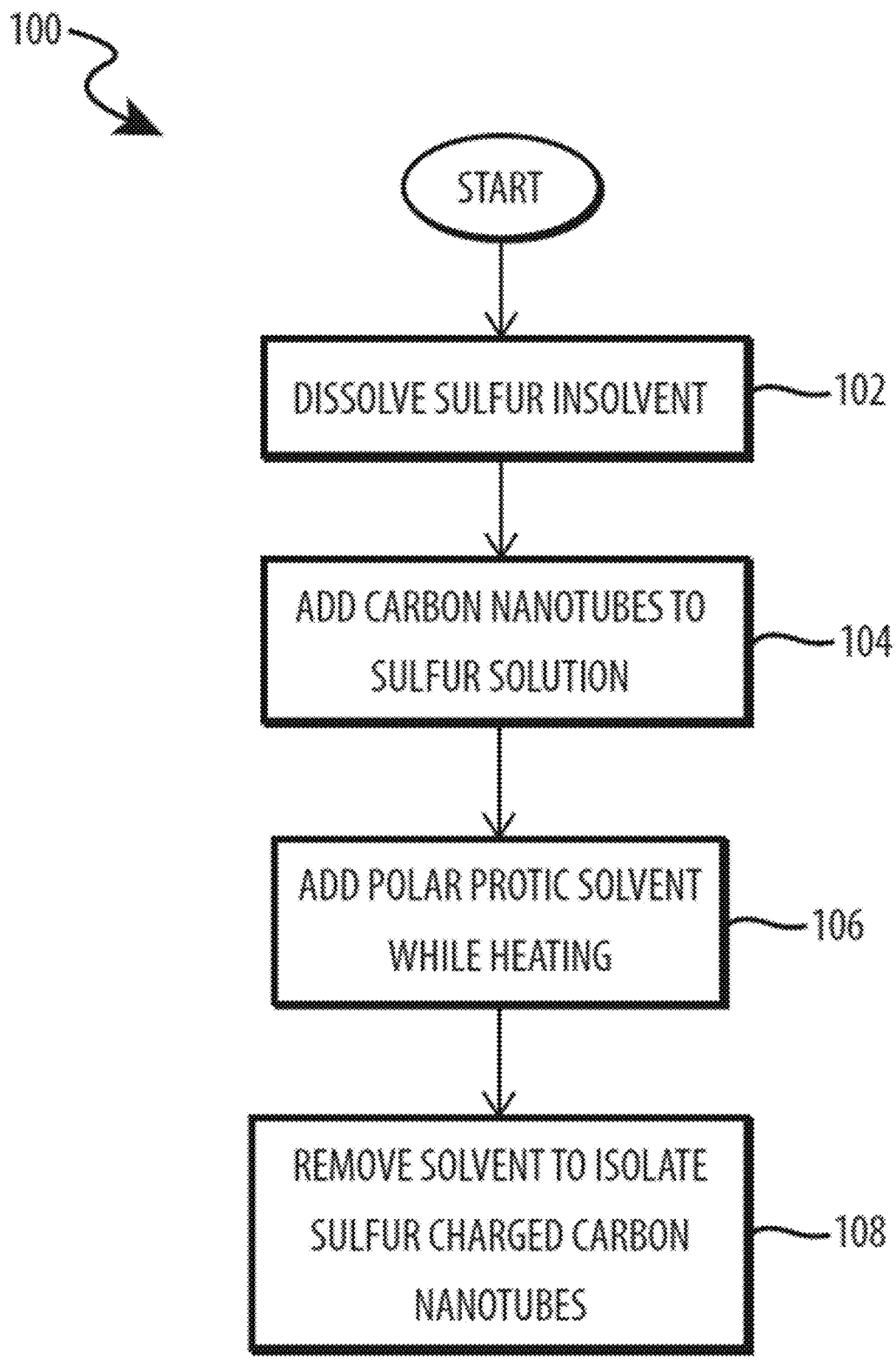
FIG. 1 is a flow diagram depicting operational steps for producing sulfur charged carbon nanotubes.

Embodiments described herein provide methods for creating sulfur charged carbon nanotubes, which may be used in Li—S battery cathodes. As described in further detail below, encapsulating sublimed sulfur in carbon nanotubes may compensate for the poor electrical conductivity of sulfur without sacrificing the increased capacity of sulfur cathodes. Additionally, the carbon nanotubes allow for polysulfides to form, providing a diffusion path for lithium ions, while reducing the ability of the polysulfides to branch into the electrolyte solution toward the anode and short the battery. Embodiments described herein enable, among other things, low cost, high yield, and scalable methods of producing sulfur charged carbon nanotube cathodes for use in Li—S batteries Turning now to the figures, FIG. 1 is a method, generally designated 100, depicting operational steps for producing sulfur charged carbon nanotubes. In operation 102, sulfur is dissolved in a solvent. In various embodiments, the sulfur may be sublimed elemental sulfur. The solvent may be any suitable solvent. In one embodiment, the solvent is carbon disulfide ($CS_2$). In various embodiments, the amount of sulfur may be determined based on the amount of solvent and the amount of sulfur charged carbon nanotubes desired. For example, the sulfur may be approximately 50% wt-98% wt of the combined sulfur-nanotube mixture. In certain embodiments, one gram of sublimed sulfur may be added for every five ml of $CS_2$. Those skilled in the art will appreciate that different combinations are possible so long as the sulfur is completely dissolved in the solvent. The sulfur and solvent may be stirred, sonicated, and/or heated in order to increase the solubility of the sulfur in the solvent and/or ensure even dispersion of the sulfur in the solution. In certain embodiments, the solution may be heated to 32°-33° C. while stirring.

In operation 104, carbon nanotubes are added to the sulfur solution. The quantity of carbon nanotubes may be depend on the desired final composition of the sulfur charged carbon nanotubes. In various embodiments, the amount of nanotubes may be approximately 2% wt-50% wt of the combined sulfur-nanotube mixture. In various embodiments, the carbon nanotubes may be any of single wall, double wall, and/or multiwall nanotubes. In some embodiments, the nanotubes are less than 10 nm in diameter. In some embodiments, the nanotubes are less than 5 μm in length. In other embodiments, the nanotubes are less than 3 μm in length. In various embodiments, reducing the length of the nanotubes can reduce bundling of the nanotubes and provide more even coatings when applied to an electrode material. The type of carbon nanotube may be selected based on the desired electrical properties of the resulting cathode. The mixture containing the sulfur, solvent, and nanotubes may be sonicated and/or stirred to evenly disperse the carbon nanotubes in the mixture. By first dissolving the sulfur in the solvent, the carbon nanotubes are filled with sulfur by nanocapillary action. Capillary action is the ability of a liquid to fill a narrow space without (or in contravention of) external forces working on the liquid (e.g., gravity). In small diameter tubes, such as carbon nanotubes, capillary action results from intermolecular forces within the liquid (e.g. surface tension) and adhesive forces between the liquid and the nanotube.

In operation 106, a polar protic solvent is added while heating the sulfur-nanotube mixture. In various embodiments, the polar protic solvent may be methanol, isopropyl alcohol, ethanol, and distilled water. In certain embodiments, the polar protic solvent may be added at a controlled rate (e.g., drops at a rate of 1 ml/min). The sulfur-nanotube mixture may be stirred and/or heated while adding the polar protic solvent. For example, the mixture may be heated to a temperature of 33°-35° C. By varying the rate at which the polar protic solvent is added to the solution, the size of sulfur particles may be controlled. Additionally, the polar protic solvent may facilitate a pi bond between sulfur particles and the carbon nanotubes, allowing sulfur to bond to the outside of the nanotubes in addition to filling the nanotubes via the nanocapillary action described above. By attaching sulfur to the outside of the carbon nanotubes, the cyclability and capacity of a resulting Li—S battery may be increased.

In operation 108, the solvent (i.e., the solvent described above with respect to operation 102) is removed to isolate the sulfur-carbon nanotube product. The solvent may be removed by any means that does not damage the sulfur-carbon nanotube product. In certain embodiments, the sulfur-carbon nanotube mixture may be heated (e.g., to 35° C.) to evaporate a portion of the solvent until a moist mixture remains. The remaining moist mixture may be spread on a tray to air dry and allow any remaining solvent to evaporate. A two-stage drying process, as described herein, may help the resulting sulfur-carbon nanotube product maintain a particulate form, which can facilitate later processing steps. In certain embodiments, the resulting sulfur-carbon nanotube product may be ground into fine particles to facilitate later processing steps. In various embodiments, the evaporated solvent may be captured and reused in future processes, thereby reducing unusable byproducts produced in fabricating sulfur charged nanotubes. The embodiment of FIG. 1 produces particulate sulfur-charged nanotubes with sulfur filling the carbon nanotubes and attached to the exterior of the nanotubes. The structure of the resulting sulfur charged carbon nanotubes is described in further detail below with respect to FIGS. 3 and 4.

Figure 2:
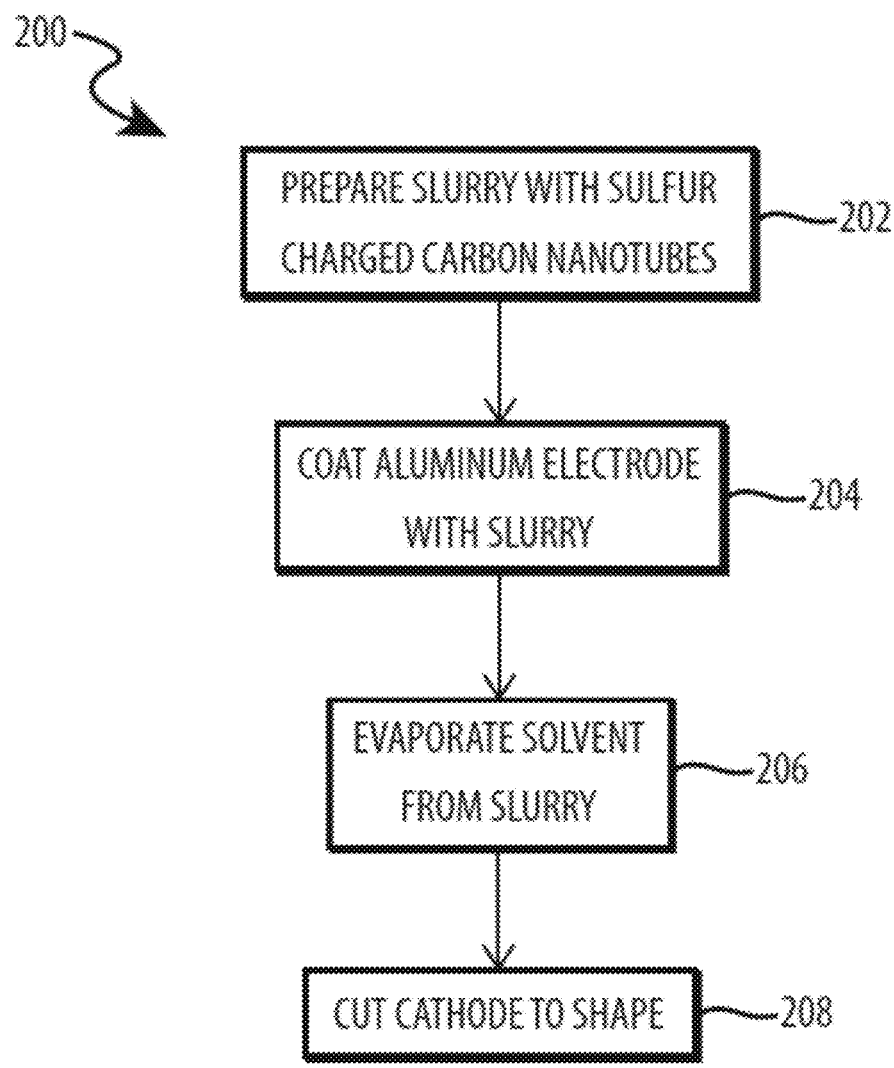
FIG. 2 is a flow diagram depicting operational steps for producing a sulfur-charged carbon nanotube cathode for use in a lithium ion battery.

FIG. 2 is a method, generally designated 200, depicting operational steps for producing a sulfur charged carbon nanotube cathode for use in a lithium ion battery. The embodiment of FIG. 2 provides a process by which Li—S cathodes may be produced using sulfur charged carbon nanotubes, such as those described above with respect to FIG. 1.

In operation 202, a slurry is prepared with a sulfur charged carbon nanotubes. The slurry may include, for example, a binding agent, such as poly(acrylonitrile-methyl methacrylate), a conductive carbon additive, and a solvent, such as N-methylpyrrolidinone. The binding agent may adhere the sulfur charged carbon nanotubes to one another. The conductive carbon additive may increase the conductivity of the resulting cathode. The solvent may be used to achieve a desirable viscosity of the slurry to ease the manufacturing product and ensure an even coating of the sulfur charged carbon nanotubes on the cathode.

In operation 204, an aluminum electrode is coated with the slurry. In various embodiments, the aluminum electrode may be a sheet of aluminum foil. The slurry coating may have a thickness of approximately 20-50 μm. The binding agent described above with respect to operation 202 may also act to bind the slurry to the aluminum electrode. The coated electrode may optionally be compressed using a roll press to achieve a desired thickness of the slurry coating. Those skilled in the art will appreciate that varying the thickness of the slurry, and, therefore, the layer of sulfur charged carbon nanotubes, the properties of the resulting cathode may be adjusted. For example, increasing the thickness of the sulfur charged carbon nanotubes may increase the amount of lithium that may penetrate the cathode. In operation 206, the solvent (i.e., the solvent added in operation 202) is evaporated from the cathode. The solvent may be evaporated using any appropriate mechanism. In one embodiment, the aluminum electrode with slurry coating are placed in an oven and heated to a temperature of approximately 60° C. for a sufficient amount of time to evaporate substantially all of the solvent from the slurry. In operation 208, cathodes may be cut to shape from the sulfur charged carbon nanotube coated aluminum electrode. For example, cathodes may be cut to shape for use in button (coin) cells, pouch cells, etc.

The cathodes produced according to the method of FIG. 2 may be used in a Li—S battery having a silicon and/or germanium anode and an electrolyte to facilitate lithium shuttling. The electrolyte may include Lithium nitrate ($LiNO_3$), N-Diethyl-N-methyl-N-(2-methoxyethyl)ammonium bis(trifluoromethanesulfonyl)imide (DEMMOX), dimethyl ether (DME) and 1,3-dioxolane (DOL). For example, the electrolyte may include $0.25E^{-3}$ mol $g^{-1}$ of $LiNO_3$ ($LiNO_3$=68.95 g $mol^{-1}$), $0.25E^{-3}$ mol $g^{-1}$ of DEMMOX (DEMMOX=466.4 g $mol^{-1}$), and a 1:1 (wt.) mixture of DME and DOL.

Figure 3:
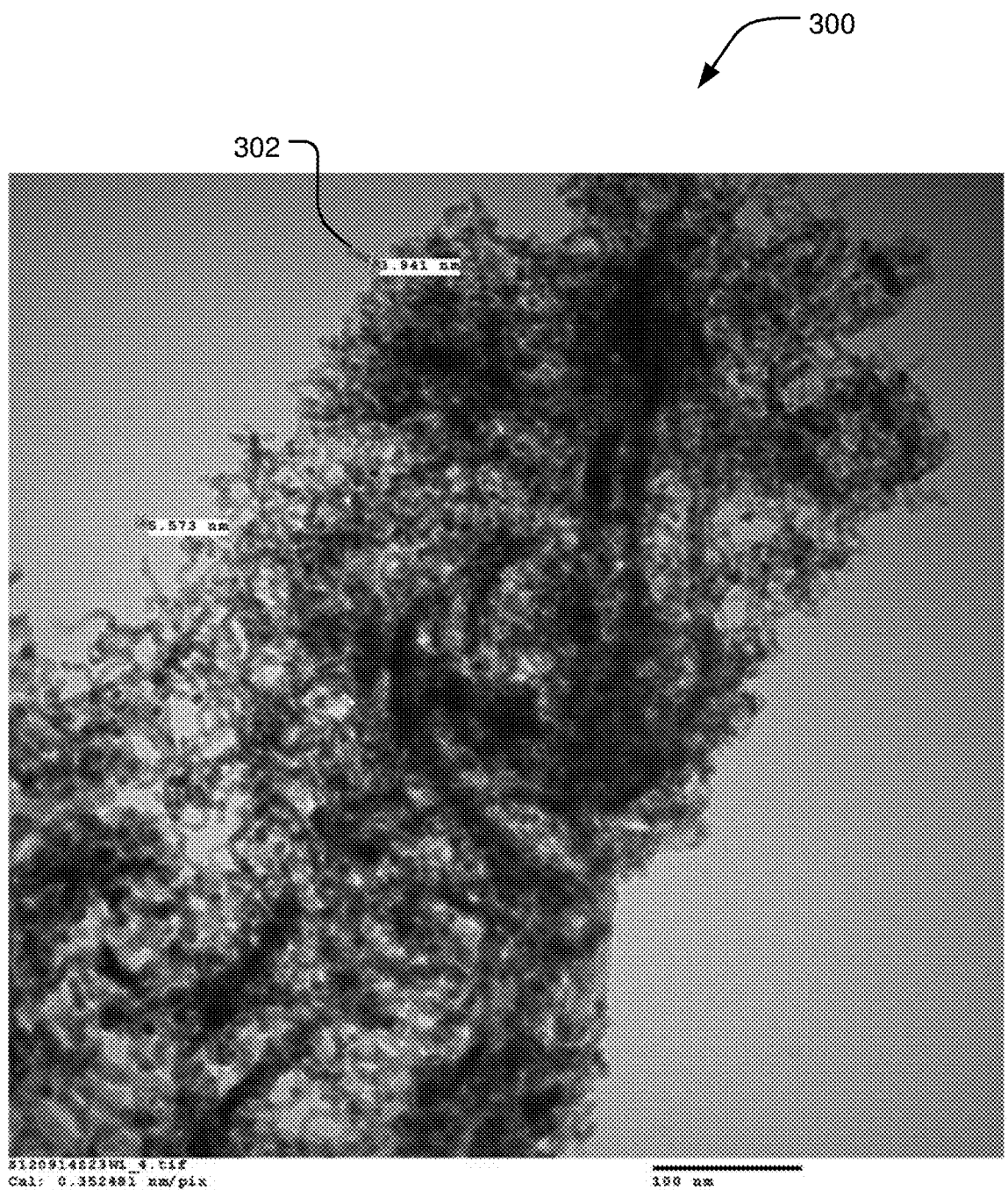
FIG. 3 is a magnified view of sulfur-charged carbon nanotubes on a cathode according to the embodiment of FIG. 2.

FIG. 3 is a sulfur charged carbon nanotube cathode, generally designated 300, according to the embodiment of FIG. 2. The cathode 300 may include a plurality of sulfur charged carbon nanotubes 302. In various embodiments, the sulfur charged carbon nanotubes may coat an electrode material, such as aluminum in a substantially even layer of between approximately 20-50 μm. The sulfur charged carbon nanotubes provide a cathode with the energy density of a Li—S battery, while containing the sulfur particles and preventing polysulfides from bridging the gap between the cathode and anode to short the battery.

Figure 4:
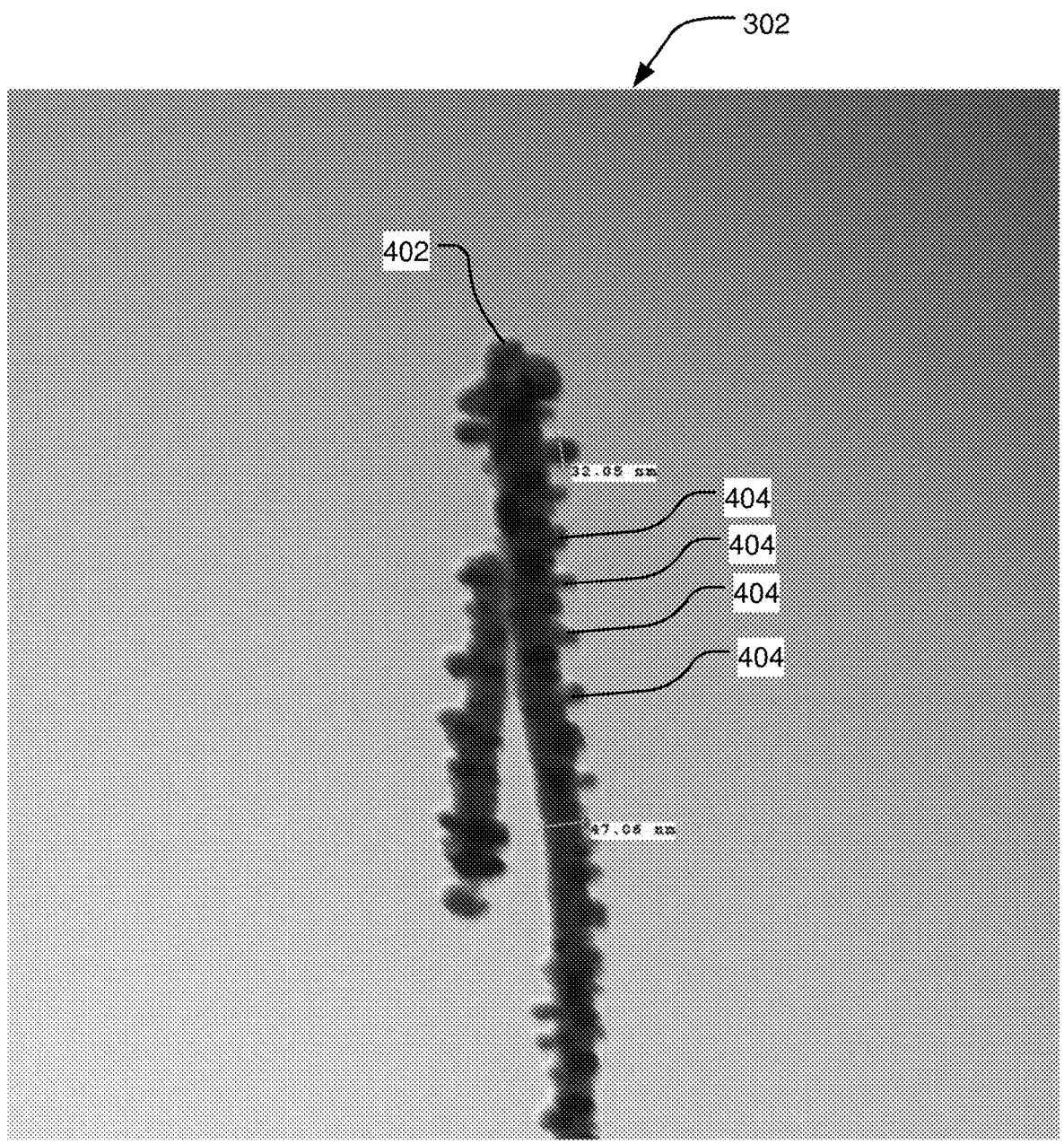
FIG. 4 is a magnified view of a sulfur-charged carbon nanotube in accordance with the embodiment of FIG. 3.

FIG. 4 depicts the sulfur charged carbon nanotube 302. The sulfur charged carbon nanotube 302 includes a carbon nanotube 402 and a plurality of sulfur particles 404 attached to the outside of the carbon nanotube 402. In various embodiments, the carbon nanotube 402 may also be filled with sulfur particles 404. As discussed above with respect to FIG. 1, the size of the sulfur particles may be controlled based on the rate at which the polar protic solvent is added to the sulfur-carbon nanotube mixture. In the depicted embodiment, the sulfur particles are approximately 30-35 nm in diameter, and the carbon nanotube 402 charged with internal sulfur particles is approximately 45-50 nm in diameter. Those skilled in the art will appreciate that other sizes of sulfur particles 404 and carbon nanotubes 402 are possible. In various embodiments, the carbon nanotube 402 may be porous (e.g., the sulfur in the carbon nanotubes stretches the carbon bonds creating "holes" in the carbon nanotubes), allowing for Li-ion diffusion during charging/discharging cycles.

Figure 5:
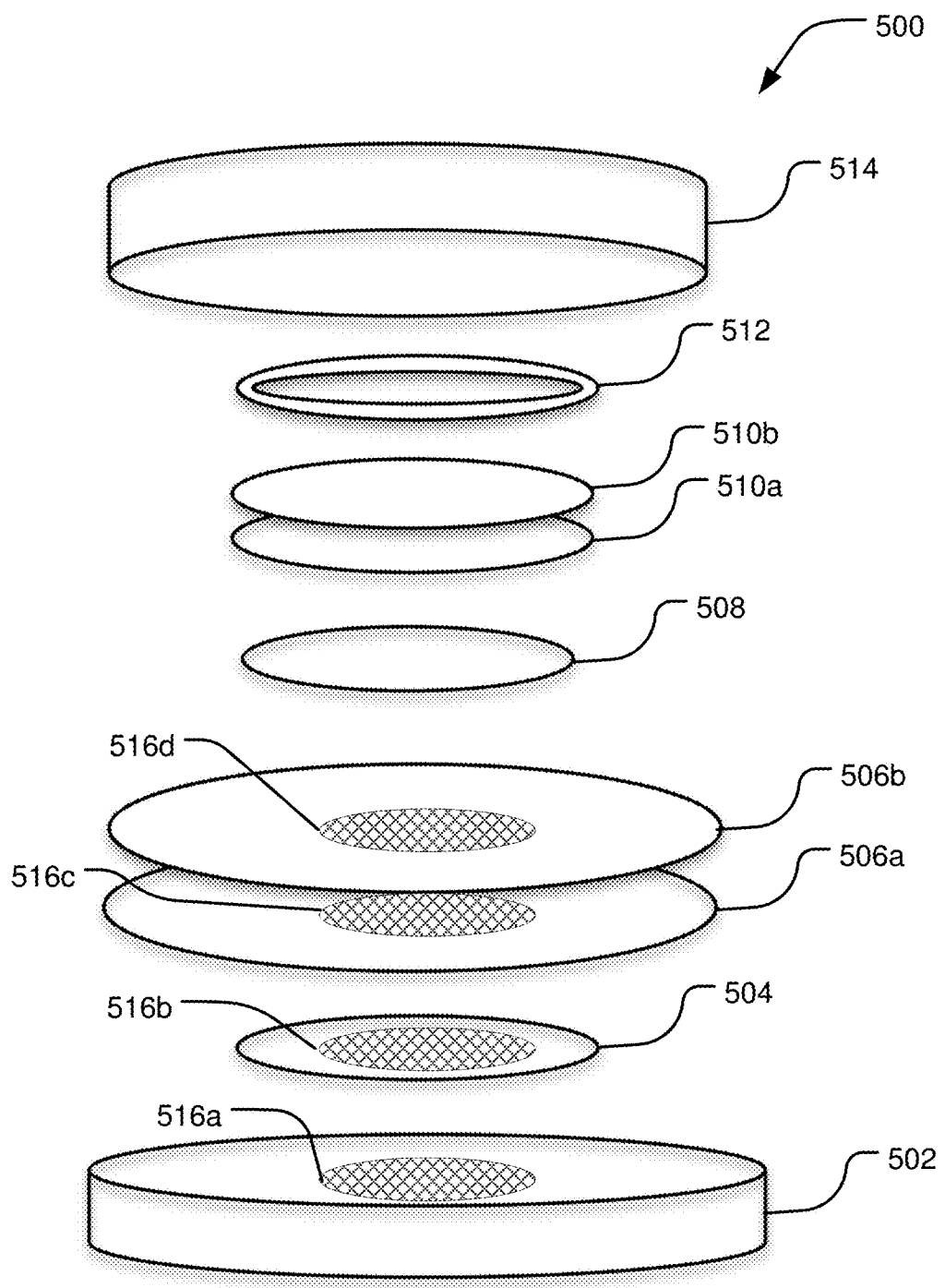
FIG. 5 is a schematic diagram of a half-cell incorporating a sulfur charged carbon nanotube cathode.
Figure 6:
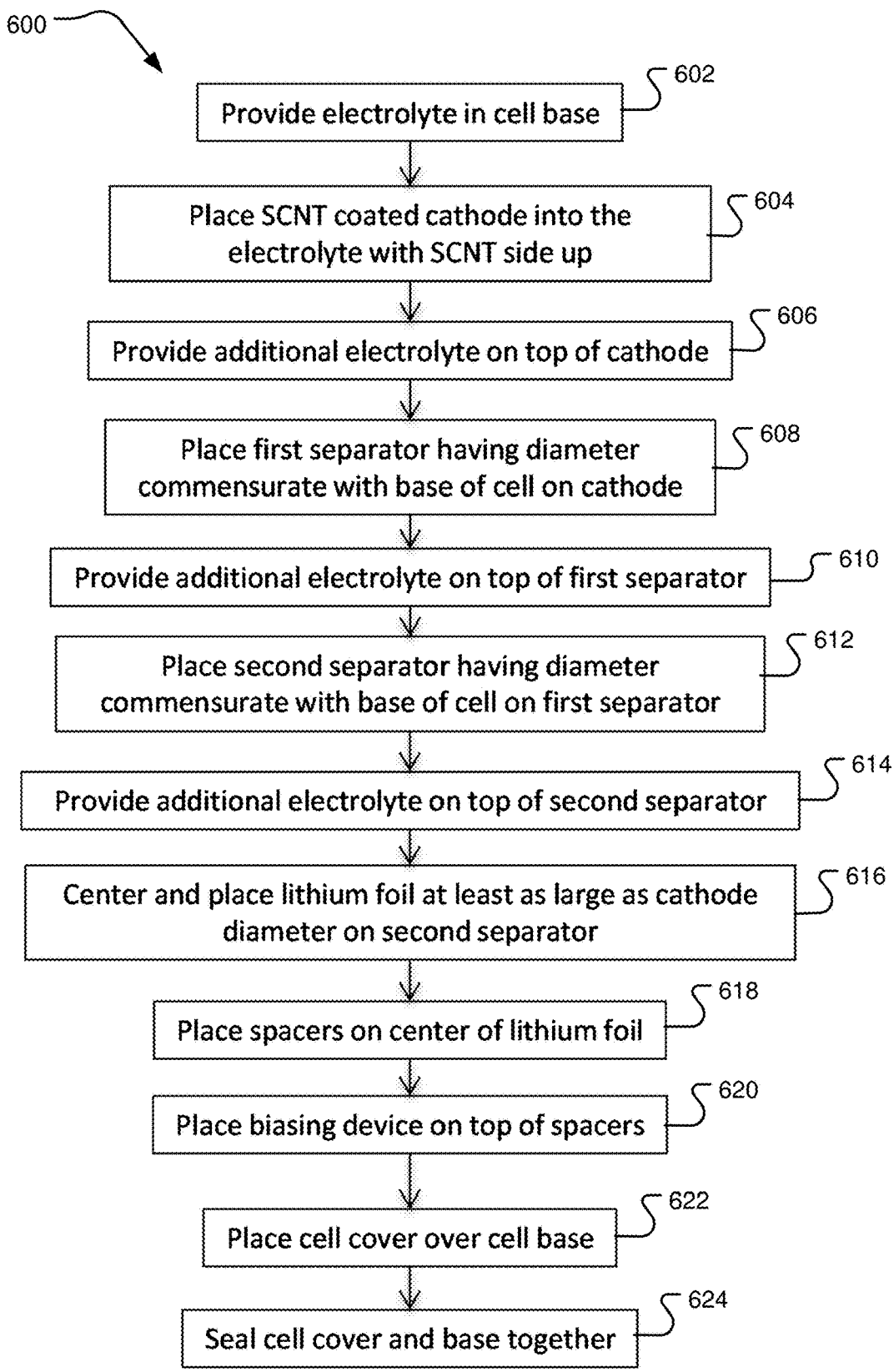
FIG. 6 is a flow diagram of a process for manufacturing a half-cell incorporating a sulfur-charged carbon nanotube cathode.

Turning now to FIGS. 5 and 6, FIG. 5 is a schematic view of a half-cell cathode, generally designated 500, for use in a coin cell. FIG. 6 is a method, generally designated 600 for assembling a half-cell cathode in accordance with the embodiment of FIG. 5. The half-cell cathode may include a cell base 502, a sulfur charged carbon nanotube cathode 504, one or more separators 506a/b, lithium foil 508, one or more spacers 510a/b, a biasing device 512, and a cell cover 514.

In step 602, an electrolyte 516a is provided to the cell base 502. The electrolyte may be, for example, $0.25E^{-3}$ mol $g^{-1}$ of $LiNO_3$ ($LiNO_3$=68.95 g $mol^{-1}$), $0.25E^{-3}$ mol $g^{-1}$ of DEMMOX (DEMMOX=466.4 g $mol^{-1}$), and a 1:1 (wt.) mixture of DME and DOL. In one embodiment, 25 μL of the electrolyte 516a is provided to the center of the cell base 502. In step 604, the sulfur charged carbon nanotube cathode 504 is placed into the electrolyte 516a. In various embodiments, the cathode is placed with the aluminum contact of the cathode 504 toward the cell base 502 and the sulfur charged carbon nanotube coated side away from the cell base 502. In step 606, additional electrolyte 516b is provided on top of the sulfur charged carbon nanotube side of the cathode 504. In one embodiment 25 μL of electrolyte 516b is provided on top of the cathode 504.

In step 608, a first separator 506a is placed on top of the electrolyte solution and the cathode 504. In various embodiments, the first separator 506a may have a diameter commensurate with the diameter of the cathode 504. In certain embodiments, the first separator 506a may be a 19 mm polypropylene separator. In step 610, additional electrolyte 516c is provided on top of the first separator 506a. In one embodiment 25 μL of electrolyte 516c is provided on top of the first separator 506a. In step 612, a second separator 506b is placed on top of the electrolyte solution 516c and the first separator 506a. In various embodiments, the second separator 506b may have a diameter commensurate with the diameter of the first separator 506a. In certain embodiments, the second separator 506b may be a 19 mm polypropylene separator. In step 614, additional electrolyte 516d is provided on top of the second separator 506b. In one embodiment 25 μL of electrolyte 516d is provided on top of the second separator 506b.

In step 616, a disc of lithium foil 508, that is at least as large as the cathode diameter, is centered and placed on the electrolyte 516d on the second separator 506b. In various embodiments, the disc of lithium foil 508 may completely cover the cathode 504. In step 618, the one or more spacers 510a/b are placed on top of the lithium foil 508. In various embodiments, the spacers 510a/b may be stainless steel spacers. In various embodiments, two spacers 510a/b are placed on the lithium foil 508. In step 620, the biasing device 512 is placed on top of the spacers 510a/b. In various embodiments, the biasing device 512 may be a spring washer. In other embodiments, the biasing device 512 may be any other type of biasing device that does not interfere with the electrical properties of the half-cell cathode 500. In step 622, the cell cover 514 is placed over the cell base 502 to enclose the contents of the half-cell cathode 500. In various embodiments, enclosing the half-cell cathode 500 may cause electrolyte to leak from the half-cell cathode 500. Any electrolyte may be removed from the outside of the half-cell cathode 500. In step 624, the cell cover 514 and the cell base 502 are sealed together to create a complete half-cell cathode 500. The half-cell cathode 500 may be used to make a full coin cell as described in further detail below with respect to FIGS. 15 and 16.

Lithium Ion-Intercalated Nanocrystal Anodes

Silicon and germanium crystals can theoretically accommodate large numbers of lithium ions. The atomic ratio of Li atoms that can be utilized by Si or Ge atoms is 4.4:1. (or 22 Li:5 Si or Ge). Lithium ions are small enough to fit in between the spaces of the atoms making up a silicon or germanium crystal lattice. Further, germanium is inherently able to accept lithium ions at a faster rate than other proposed anode materials this has been empirically verified with test data. Lithium-ion diffusivity into Ge is 400 times faster than silicon and nearly 1000 times faster than standard Li-ion technology.

Figure 7A:
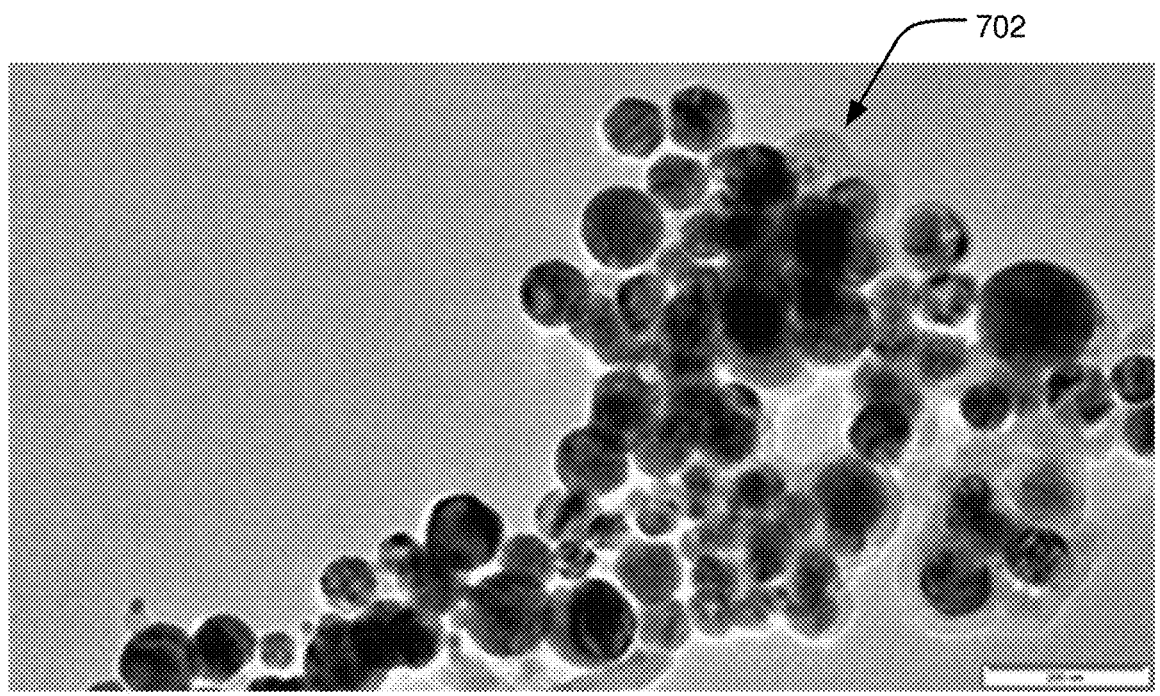
FIG. 7A is a magnified image of a collection of pristine germanium nanocrystals
Figure 7B:
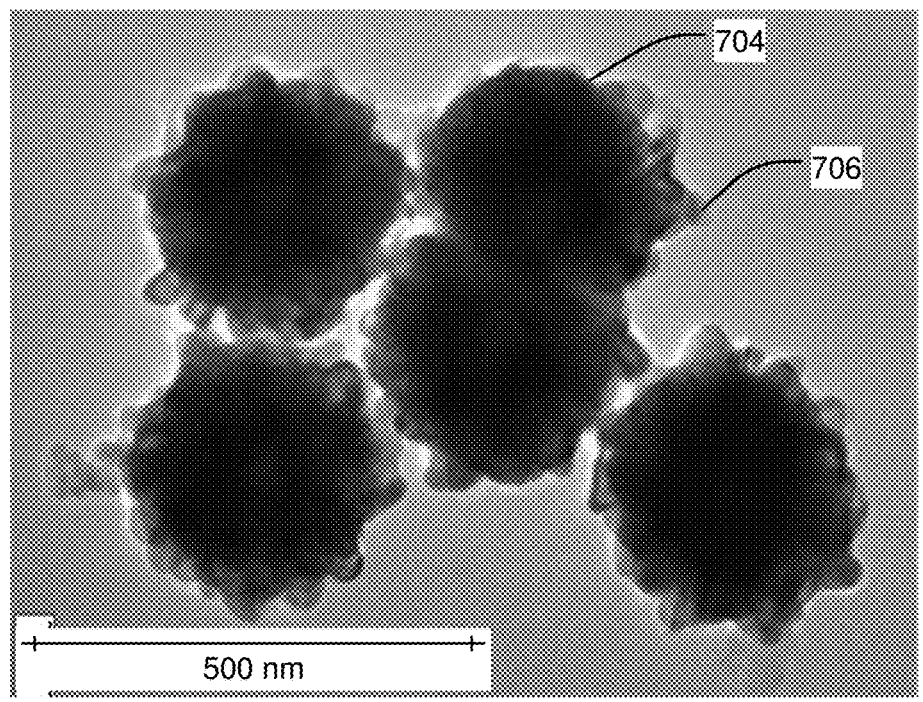
FIG. 7B is a magnified image of a collection of germanium nanocrystals post intercalation with lithium atoms exhibiting expansion and a nanopore morphology.

FIG. 7A is a micrograph of a group of germanium nanocrystals 702 in a pure state. A further magnified image of pure germanium nanocrystals is shown in FIG. 7B. The general form is highly spherical, indicating a high quality, uniform crystal formation conducive to maximizing the diffusive packing of lithium ions. Further, the surface morphology indicates a number of distended protrusions 706 on each of the nanocrystals 704. This morphology translates into a significantly larger surface area for germanium nanocrystals as compared to silicon or other similar nanoscale crystal structures. The greater surface area is advantageous to promoting more rapid diffusion of lithium ions into the crystal lattice during recharge cycles. In fact, the cnductivity of Ge is 10,000 times higher than that of Si, and the diffusivity of Li ion in Ge is 400 times faster than that of Si at room temperature, i.e., the recharge rate for Ge is 400 times faster than the recharge rate for Si.

Figure 7C:
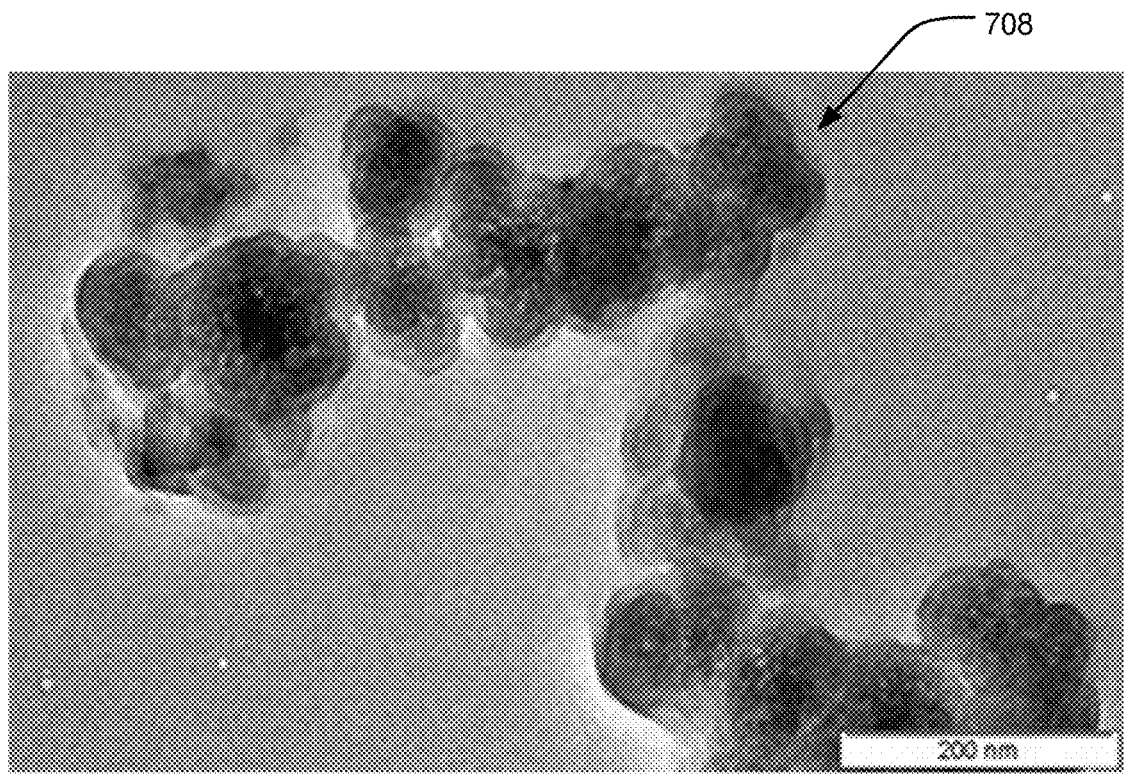
FIG. 7C is a magnified micrograph image of a group of germanium nanocrystals.

FIG. 7C depicts a micrograph of group of lithiated germanium nanocrystals 708 similar in scale to the pure nanocrystals 702 of FIG. 7A. Comparison of the morphology of the pure nanocrystals 702 to the lithiated nanocrystals 708 indicates the expansion of the crystal lattice to accept the high ratio of lithium ions. In particular, the lithiated germanium nanocrystals 708 exhibit a nanoporous structure caused by the expansion of the nanocrystal lattice to accommodate the lithium ion intercalation. For high quality (spherically uniform) Ge nanocrystals, the expansion is isotropic, which minimizes strain on the crystal lattice structure and allows for very high cycle rates and minimizes irreversible capacity loss. Conversely, large nanocrystals of silicon typically expand anisotropically and therefore are subject to rapid capacity loss after only several cycles. However, if the Si nanocrystals are formed small enough (i.e., <100 nm and preferably <50 nm) the crystal structure is more uniform and expansion behaves more isotropically, causing less stress on the nanocrystal structure and thus increasing the cycling capacity.

In a lithium ion battery, the lithium source needs to be in the anode or the cathode; it cannot be in both. A charged battery contains all of the lithium in the anode. Commercially available batteries typically have all of the lithium stored in the cathode in the form of a lithium metal oxide, i.e., lithium cobalt oxide or lithium manganese oxide or similar. At the end of the manufacturing process for Li-ion batteries, all of the batteries have to be cycled at least once for the lithium to be inserted into the anode so that the battery is already charged when a consumer purchases it in a store. Lithium-metal-oxide cathodes have very limited capacity, on the order of 200-300 mAh/g at best.

If an anode, such as germanium, has an energy capacity of 1000 mAh/g, it cannot be effectively paired with commercially available cathodes. Because of the diffusion limits of lithium, one cannot simply add 4-5 times as much cathode material to compensate for an equal volume of anode material. In view of this dilemma, the present disclosure describes cost effective processes for the creation prelithiated, high energy density anode materials for pairing with practical and low cost cathode materials (e.g., sulfur) that will readily accept the lithium stored in the anode. The anode of the full battery cell thus has lithium already combined/contained within the silicon or germanium nanocrystals, alleviating the need for a lithium compound cathode and an initial cycle to charge the battery for first use.

In exemplary embodiments, the anodes described herein may comprise nanocrystal ("NC") structures of silicon (Si), germanium (Ge), or silicon-germanium (SiGe) described herein intercalated with lithium ions (Li+) (sometimes abbreviated herein "Li—SiNC," "Li—GeNC," and "Li—SiGeNC," respectively), and any combination thereof. As used herein, the terms "intercalation" or "diffusion" or "alloy" when referring to lithium intercalation into SiNC, GeNC, and/or SiGeNC as described herein refers to both intercalation into the crystal lattice of discrete nanocrystals and intercalation between nanocrystals. These lithiated nanocrystals are then bound to a conductive substrate to form a structurally viable anode. In the exemplary anode structures and manufacturing processes described herein, the nanocrystals need to be of "high quality" in order to achieve the significant anode lithiation results disclosed herein. "High quality" in the case of Si and Ge nanocrystals for use in lithium-ion battery anodes means below that Si nanocrystals have diameters of less than 150 nm and are substantially spherical in shape and that Ge nanocrystals have diameters less than 500 nm and are substantially spherical in shape. The smaller the diameter of the nanocrystal, the greater the packing factor in the film, thus resulting in greater energy density. A higher packing factor can be achieved with bimodal and trimodal distributions e.g., 50 nm, 17 nm, 6.5 nm nanocrystal size distributions.

In some embodiments, cells, batteries, and similar devices described herein may comprise unstrained SiGeNC and/or GeNC. In some embodiments, the batteries and similar devices described herein may comprise strained SiGeNC and/or strained GeNC. As used herein, the terms "strained SiGeNC" and "strained GeNC" refers to SiGeNC and/or GeNC having a strained crystal structure, which is marked by a shift in a crystal plane when analyzed by x-ray diffraction. Strained SiGeNC and GeNC referenced herein may, in some embodiments, have a 2θ value for the (111) crystal plane shifted relative the (111) crystal plane of bulk silicon from a lower limit of about 1°, 2°, or 3°, or 4° to an upper limit of about 8°, 7°, 6°, 5°, or 4°. The shift may range from any lower limit to any upper limit and encompass any subset therebetween.

Unless otherwise specified, the terms "SiGeNC" and "GeNC" encompass both unstrained and strained structures thereof. Further, as described herein, the SiGeNC and GeNC having the various properties and/or characteristics described herein (e.g., 2θ value shift, average diameter, and the like) may be used to produce Li—SiGeNC and Li—GeNC, respectively. As such, it should be understood that the properties of the SiGeNC and GeNC described herein may extend to the Li—SiGeNC and Li—GeNC described herein.

In some embodiments, the SiGeNC described herein may comprise a mole ratio of silicon to germanium that ranges from a lower limit of about 1:10, 1:5, or 1:1 to an upper limit of about 10:1, 5:1, or 1:1, and wherein the mole ratio may range from any lower limit to any upper limit and encompasses any subset therebetween.

In some embodiments, the SiNC, SiGeNC, and/or GeNC described herein may be p-doped or n-doped. In some embodiments, the SiGeNC may be in a "core-shell" configuration with a germanium lattice core surrounded by a silicon lattice shell. In some embodiments, the SiGeNC may merely be a combination or mixture of separate SiNCs and GeNCs.

In some embodiments, the SiNC, SiGeNC, and/or GeNC described herein may have an average diameter in at least one dimension ranging from a lower limit of about 3 nm, 5 nm, 10 nm, 25 nm, or 100 nm to an upper limit of about 1000 nm, 500 nm, 250 nm, 150 nm, 100 nm, or 50 nm. The average diameter in at least one dimension may range from any lower limit to any upper limit and encompasses any subset therebetween. In particular, SiNC may be under 150 nm diameter and preferably under 50 nm. Germanium nanocrystals may be under 1000 nm in diameter and preferably under 100 nm. Above these diameters the, nanocrystals may not maintain long range order after several lithiation-delithiation cycles and the materials become amorphous.

In some embodiments, the SiNC, SiGeNC, and/or GeNC described herein may have a narrow diameter distribution such that the standard deviation from the average diameter ranges from a lower limit of ±about 0.5 nm, 1 nm, or 2 nm to an upper limit of ±about 10 nm, 7 nm, or 5 nm. The standard deviation may range from any lower limit to any upper limit and encompasses any subset therebetween.

Figure 8:
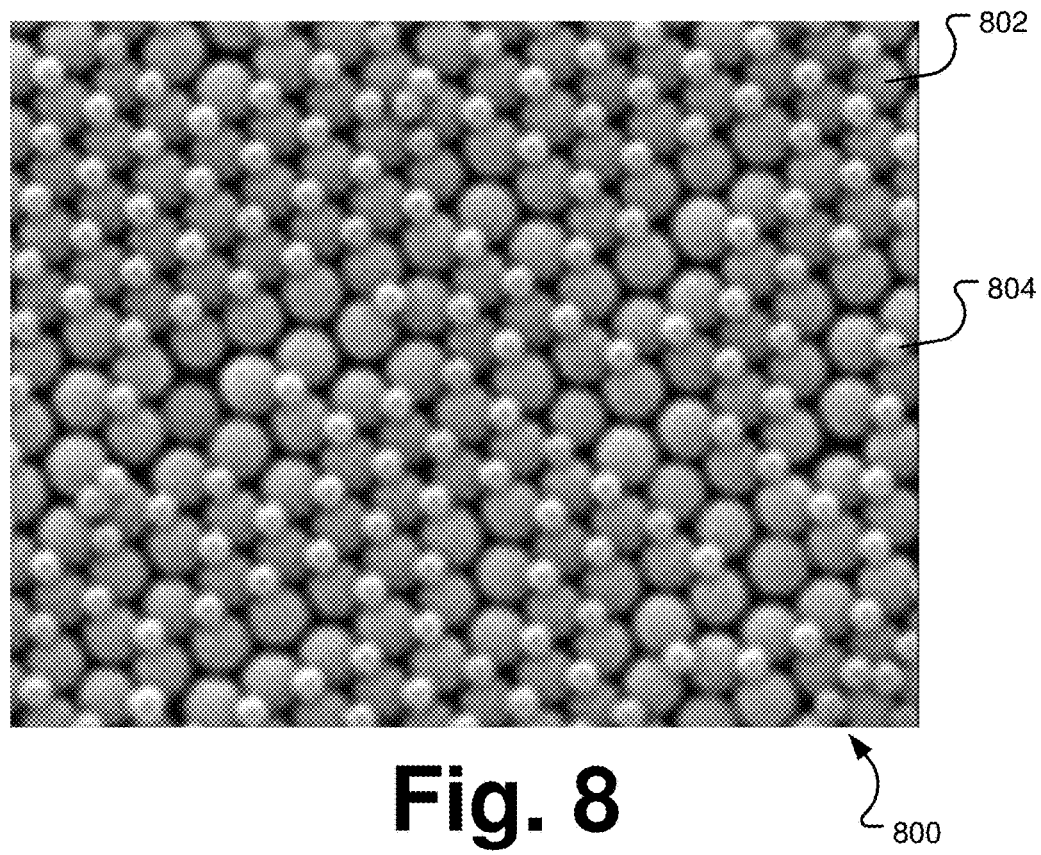
FIG. 8 is a magnified micrograph image of a germanium nanocrystal deposition having a bimodal distribution of nanocrystals of two different diameters.

In some embodiments, the SiNC, SiGeNC, and/or GeNC described herein may have a multimodal diameter distribution (e.g., bimodal, trimodal, and so on). It is desirable to have a range of sizes from as-small-as-possible to the upper limits of SiNC and GeNC noted above in order to increase the packing density of the nanocrystals on a conducting anode substrate and thus maximize the diffusion density of lithium ions within and between the nanocrystals. An example of a self-organizing bimodal distribution 800 of two different sizes of germanium nanocrystals is depicted in the micrograph of FIG. 8. As shown, the larger-sized nanocrystals 802 (e.g., 50 nm diameter) arrange to form a base layer on a substrate while the smaller-sized nanocrystals 804 (e.g., 12 nm diameter) arrange in the spacing between the larger-sized nanocrystals 802. In this way, the density of the nanocrystals is increased.

In exemplary embodiments, the SiGeNC and/or GeNC described herein having a multimodal diameter distribution may have at least one mode with an average diameter in at least one dimension ranging from a lower limit of about 4 nm, 7 nm, 12 nm, or 25 nm to an upper limit of about 250 nm, 150 nm, 100 nm, or 50 nm. The average diameter in at least one dimension may range from any lower limit to any upper limit and encompasses any subset therebetween. In some embodiments, the modes of a multimodal diameter distribution of the SiNC, SiGeNC, and/or GeNC described herein may independently have a narrow diameter distribution such that the standard deviation for each mode independently ranges from a lower limit of ±about 0.5 nm, 1 nm, or 2 nm to an upper limit of ±about 10 nm, 7 nm, or 5 nm. The standard deviation may range from any lower limit to any upper limit and encompasses any subset therebetween.

In some embodiments, the Li—SiGeNC and Li—GeNC described herein may have a mole ratio of Li to SiGe (i.e., the combined moles of Si and Ge) or Li to Ge, respectively, ranging from a lower limit of greater than 0, about 0.2, 0.5, 1, 1.5, or 2 to an upper limit of about 3.6, 3.5, 3.25, 3, 2.5, 2, or 1.5. The mole ratio of Li to SiGe or Li to Ge may range from any lower limit to any upper limit and encompasses any subset therebetween. It should be noted that such mole ratios are described in terms of a fully charged battery or other similar device. The mole ratio of Li to SiGe or Li to Ge may depend on, inter alia, the ratio of the lithium source to the SiGeNC and/or GeNC in the synthesis of the Li—SiGeNC and/or Li—GeNC.

In some embodiments, lithium intercalation may be effected at least one of: mixing the SiGeNC and/or GeNC with lithium metal (e.g., folding the two together and allowing the lithium to intercalate), mixing the SiGeNC and/or GeNC with lithium metal in the presence of an ionic liquid, electrodepositing the SiGeNC and/or GeNC on lithium metal electrode, and the like. In some embodiments, the ionic liquid and electrodeposition may be used in combination.

In some exemplary implementations, elemental lithium from a lithium metal electrode intercalates into the SiNC, SiGeNC, and/or GeNC attracted to the surface thereof such that a paste of lithiated nanocrystals and ionic liquid forms on the lithium metal electrode. The paste has a dark-brown to purple-black color depending on the amount of lithium present. It has been observed that the paste of Li—SiGeNC and/or Li—GeNC is stable in air for extended periods of time and may be exposed to water without reaction unlike lithium metal. The intercalation of the lithium ions within the nanocrystal structures protects the lithium from interaction with air and moisture. Further, in the case of GeNCs, germanium does not form surface oxides in air like silicon, which further improves the diffusion speed of lithium ions.

Once formed, the lithiated nanocrystal paste may be used in further anode manufacturing processes without need for a protective environment (e.g., an argon-filled enclosure), which can significantly reduce the cost and difficulty of the process. Further, the nonvolatile paste may advantageously enable batteries and similar devices with minimal to no risk of fire in the event of battery damage that exposes the anode to air or water. Such an advantage and risk mitigation may be exploited in the production of lighter-weight batteries because the battery casings may be made of different materials, which may be useful in electric vehicles where much of the battery weight can be attributed to protection from puncture in crashes.

In some embodiments, the anode may comprise a conductive support having a film disposed thereon, the film comprising the nanocrystals described herein. Examples of the conductive supports may include, but are not limited to, silicon, germanium, graphite, nickel, iron, stainless steel, aluminum, copper, and the like, and any combination thereof. In some embodiments, the conductive support may be in a form that is at least one of the following: a sheet, a foil, a grid, a rod, and the like, and any hybrid thereof, which may, inter alia, depend on the configuration of the battery or other device in which the anode is to be used.

In some embodiments, the film may consist essentially of the nanocrystals described herein. In other embodiments, the film may comprise the nanocrystals described herein and optionally further comprise binders and/or existing anode materials. These optional components may be used to achieve the desired physical characteristics of the film and/or the precursor thereof. Examples of physical characteristics may include, but are not limited to, the rheology of the film precursor, the drying characteristics of the film precursor, the film plasticity, the film conductivity, the adhesion strength of the film to the conductive support, and the like, and any combination thereof.

In some embodiments, binders may be useful in achieving the desired physical characteristics of an anode film or precursor thereof by adhering the nanocrystals together or to a conductive support. The binders may minimally, if at all, impact the electrochemistry of the resultant battery or similar device in which the anode is used. Binders may be conductive or insulating. Examples of binders may include, but are not limited to, polyvinylidene fluoride, N-methyl-2-pyrrolidone, carboxymethyl cellulose, agar, styrene-butadiene rubber, polytetrafluoroethylene, conductive acetylene black, conductive graphite powders, and the like, and any combination thereof. In some embodiments, the binder may be selected to enable a hydrogel or organogel film (e.g., crosslinked agar or carboxymethyl cellulose). In some embodiments, the binder may be selected to enable a printable film precursor that dries like ink (e.g., conductive graphite powder). In some embodiments, the binder may be selected to enable a flexible, dry film (e.g., styrene-butadiene rubber or polytetrafluoroethylene).

Existing anode materials may be useful in achieving the desired physical characteristics of the film or precursor thereof and may participate in the electrochemistry of the resultant battery or similar device in which the anode is used. In some embodiments, the use of existing anode materials may be minimized or eliminated because they provide little to no enhancement to the anode properties and occupy volume that could otherwise be filled by nanocrystals described herein. Examples of existing anode materials may include, but are not limited to, graphite powder, carbon microbeads, $Li_4Ti_5O_{12}$, $LiVPO_4F$, and the like, and any combination thereof.

The concentration of the various components in the film precursor may be at levels necessary to achieve the desired physical characteristics of the film and/or the precursor thereof and the desired electrochemical characteristics of the anode, which may allow for each of the component concentration to vary between about 0% and about 99% by weight of the film precursor.

In some embodiments, the film precursor may be a paste. For example, a film precursor may be the paste described above that is produced during at least some embodiments of the synthesis of Li—SiNC, Li—SiGeNC, and/or Li—GeNC. In another example, a paste film precursor may be a paste of SiGeNC, graphite, and polyvinylidene fluoride in N-methyl-2-pyrrolidone. In some embodiments, the anode may comprise a fast ion conductor layer (e.g., lithium nitride or the like) between the conductive support and the film.

In some embodiments, the film precursor may be a less viscous liquid, which may be a diluted paste or formed independently. In some embodiments, lower viscosities may be achieved with the use of organic solvents (e.g., benzene, methanol, and the like). In some embodiments, the film precursor may be at a viscosity that enables deposition onto the conductive substrate by methods like electrodeposition, spraying, painting, dip coating, calendaring, and the like. Such methods may advantageously enable scaling the production of anodes described herein to industrial production levels, e.g., using coating methods similar to that used in the semiconductor industry or using printing methods in producing flexible batteries or similar devices.

In some embodiments, after deposition onto a conductive substrate, the film precursor may be dried to yield the film that comprises the pre-lithiated nanocrystals described herein (e.g., between about 30° C. and about 220° C. depending on the composition of the film precursor). In some embodiments, after deposition onto the conductive substrate, the film precursor may be allowed to set to yield a hydrogel or organogel film that comprises the pre-lithiated nanocrystals described herein.

The diffusion limit of lithium into a SiNC, SiGeNC, or GeNC deposition coating is typically between 30-40 microns. Therefore, in some embodiments, the thickness of the film comprising the nanoparticles described herein may have a thickness ranging from a lower limit of about 10 microns, 25 microns, or 100 microns to an upper limit of about 500 microns, 250 microns, or 100 microns. The thickness may range from any lower limit to any upper limit and encompasses any subset therebetween.

Figure 9:
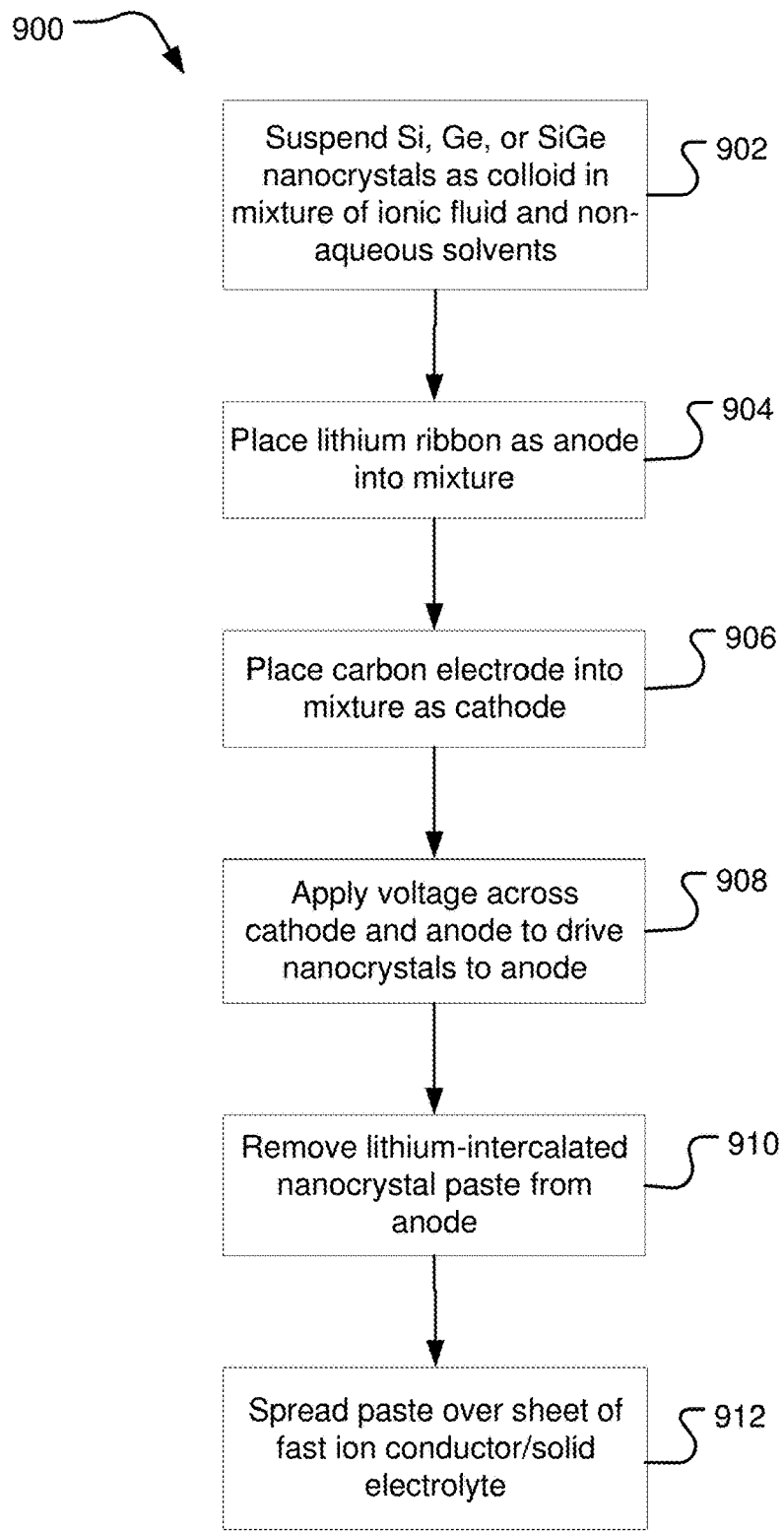
FIG. 9 is a flow diagram of a process for manufacturing a high energy capacity anode for lithium ion batteries via electrochemical super saturation of lithium into silicon, germanium, and/or silicon-germanium alloy nanoparticles.

FIG. 9 is a flowchart depicting a general electrodeposition process 900 for preparing a pre-lithiated nanocrystal paste for use in anode construction. In step 902, SiNCs, SiGeNCs, and/or GeNCs are mixed into a solution of an ionic fluid(s), a nonaqueous solvent(s), or a combination of both to form a colloidal suspension of the nanocrystals. A lithium metal ribbon is positioned in the colloidal mixture as an anode electrode as indicated in step 904. Similarly, a carbon electrode is placed into the colloidal mixture as a cathode as provided in step 906. A voltage is then applied across the anode and cathode to drive the nanocrystals from the mixture to coalesce on the lithium metal ribbon anode as indicated in step 908. Lithium ions from the lithium metal intercalate into the nanocrystals deposited on the lithium metal and the lithiated nanocrystals in the presence of the ionic fluid and/or solvent form a paste on the surface of the lithium metal ribbon. The lithium-diffused nanocrystal paste is then removed from the lithium metal anode as indicate in step 910. Finally, a prelithiated anode is formed by spreading or otherwise distributing the paste over an electrode, such as a fast ion conductor or a solid electrolyte, as indicated in step 912.

Figure 10:
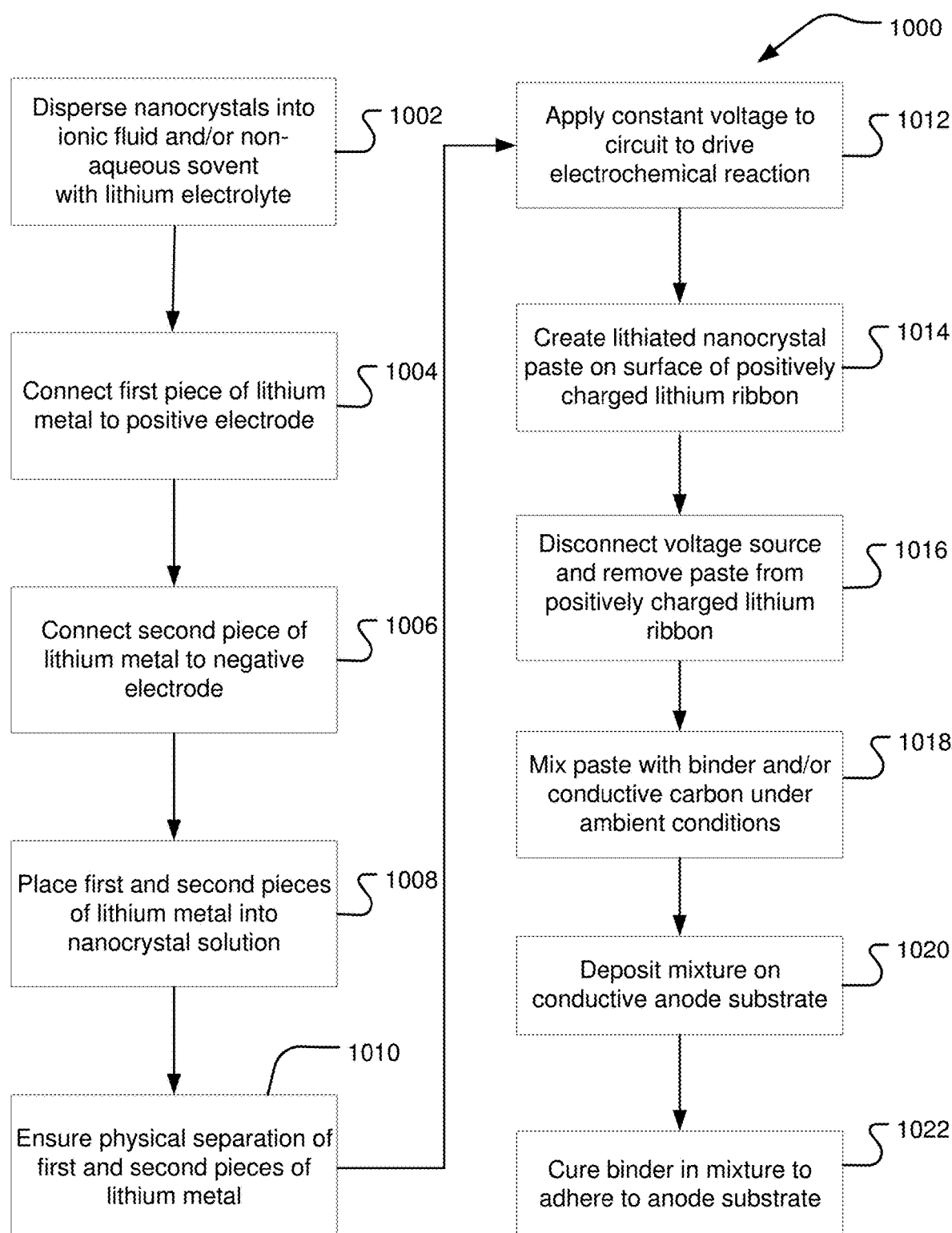
FIG. 10 is a flow diagram of a process for manufacturing a high energy capacity anode for lithium ion batteries via electrolytic super saturation of lithium into silicon, germanium, and/or silicon-germanium alloy nanoparticles.

FIG. 10 is a flowchart depicting a general electrolytic process 1000 for preparing a pre-lithiated nanocrystal paste for use in anode construction. In step 1002, SiNCs, SiGeNCs, and/or GeNCs are mixed into a solution of an ionic fluid(s), a nonaqueous solvent(s), or a combination of both, plus a lithium electrolyte, to form a colloidal suspension of the nanocrystals. A first piece of lithium metal ribbon is connected to a positive electrode as provided in step 1004 and a second piece of lithium metal ribbon is connected to a negative electrode as provided in step 1006. Each of the first and second pieces of lithium metal is positioned in the colloidal mixture as indicated in step 1008 with care taken to ensure physical separation of the lithium metal electrodes as noted in step 1010. A voltage is then applied across thee electrodes to drive the nanocrystals from the mixture to coalesce on the lithium metal ribbon anode as indicated in step 1012. The voltage is maintained until lithium ions from the lithium metal ribbon intercalate into the deposited nanocrystals and a paste of lithiated nanocrystals and solvent forms on the surface of the lithium metal ribbon as provided in step 1014. The voltage source is then disconnected from the electrodes and the lithium-diffused nanocrystal paste is removed from the lithium metal ribbon as indicated in step 1016. The paste is then mixed with binder and/or conductive carbon under ambient conditions, i.e., in air at atmospheric pressure without additional safeguards such as an inert gas or low moisture environment, as indicated in step 1018. The paste and binder mixture is then spread or otherwise distributed on a conductive anode substrate as provided in step 1020. Finally, the binder is cured in order to adhere the lithiated nanocrystal paste to the anode substrate to complete formation of a prelithiated anode as indicated in step 1022.

Example 1

Anode Construction Via Electrodeposition

In accordance with the general method shown in FIG. 9 and described above, a high-energy capacity anode for lithium ion batteries may be formed via electrochemical super saturation of lithium into silicon, germanium, and silicon-germanium alloy nanoparticles. Silicon, germanium, and/or silicon-germanium alloy nanoparticles (Universal Nanotech Corporation), were suspended as a colloid in a mixture of an ionic fluid 1-butyl-3-methylimidazolium thiocyanate (bmimSCN) and a non-aqueous solvent dimethylacetamide. A ⅔" strip of Li metal ribbon was used as an anode and carbon electrode was used as a cathode. Each was connected to a respective terminal of a voltage source and placed in the colloidal mixture. Voltage in a range of 250 mV-5 V, typically 2-4V, was applied to drive a current through the solution to begin the Li intercalation into the nanocrystals.

The nanocrystals are driven to the Li metal anode. Visually, the lithium ribbon appears to "swell" and take on a reddish-orange-maroon color. This "swelling" is a coating of the lithiated nanocrystals on the decomposed lithium ribbon. The final consistency of the resulting product is a paste or gel-like consistency with lubricity provided by the ionic fluid/solvent mixture. An anode was formed by spreading the gel with a spatula over a sheet comprised of a fast ion conductor (e.g., solid electrolyte, such as lithium nitride. The nanocrystal anode paste on the fast ion conductor structure was then sandwiched on top of a cathode material (LiMn2O4). An aluminum electrode was attached to the cathode (i.e., LiMn2O4) and a copper electrode was attached to the anode to form a battery. The entire structure was sealed in a protective nonconductive lamination sheet with portions of the aluminum and copper electrodes protruding outside the lamination sheet to serve as terminals for the battery.

Example 2

SiGeNC Lithiation Using Ionic Fluid bmimSCN

In an argon filled environment (i.e., a glove box), two separate pieces of lithium metal foil (each 2 cm L×1 cm W×0.038 cm t) were connected, respectively, to the negative and positive electrodes of a power supply. Si0.22Ge0.78NCs were dispersed into 1-butyl-3-methylimidazolium thiocyanate (bmimSCN) and heated to 40° C. under argon with constant stirring in an Erlenmeyer flask. The concentration of Si0.22Ge0.78NCs in the ionic fluid was matched to the lithium (1 cm L×1 cm W×0.038 cm t) such that nearly all the lithium was absorbed by the amount of GeNCs contained in the flask. For this experiment, 0.00288 mol Li (1 $cm^2$) and 0.0160 mol of Si0.22Ge0.78NCs were used. The electrodes were placed directly opposed to each other 1 cm apart with 1 $cm^2$ of the Li metal submerged into the Si0.22Ge0.78NCs-ionic fluid dispersion. A constant voltage 3V was used to drive the Si0.22Ge0.78NCs to the lithium metal on the positive electrode where the lithium subsequently diffused into the Si0.22Ge0.78NCs. The reaction was stopped after 25 minutes. The resultant product was a deep red paste comprised of the ionic fluid and lithiated Si0.22Ge0.78NCs.

Example 3

Anode Construction Using Electrolyte LiTFSI

The process of Example 2 was altered to introduce an electrolyte, lithium bis(trifluoromethanesulfonyl)imide (LiTFSI) to make a 1M solution of LiTFSI in bmimSCN. The general method was thus changed to follow the process shown in FIG. 10 and described above. Additionally, the process was conducted at room temperature. In all other respects the conditions were the same. The addition of the lithium salt (LiTFSI) reduced the reaction time to create the paste from 25 minutes to 15 minutes.

Example 4

Anode Construction Using Electrolyte LiP $F_6$

In accordance with the general method shown in FIG. 10 and described above, in an argon filled environment (e.g., in a glove box) at room temperature and atmospheric pressure, two separate pieces of lithium metal foil (each 2 cm L×1 cm W×0.038 cm t) were connected, respectively, to the negative and positive electrodes of a power supply. High quality (spherically symmetric) germanium nanocrystals (<150 nm diameter) were dispersed into an electrolyte of lithium salt, i.e., lithium hexafluorophosphate ($LiPF_6$) in a 1:1 ratio of ethylene carbonate to diethyl carbonate in an Erlenmeyer flask. The electrodes were placed directly opposed to each other 1 cm apart with 1 $cm^2$ of the Li metal submerged into the GeNC-electrolyte dispersion. For this experiment, 0.00288 mol $LiPF_6$ and 0.0127 mol of GeNCs were used. The concentration of germanium nanocrystals in the electrolyte was matched to the lithium (1 cm L×1 cm W×0.038 cm t) such that nearly all the lithium is absorbed by the amount of germanium contained in the flask. A constant voltage 4V was used to drive the germanium nanocrystals to the lithium metal on the positive electrode where the lithium diffused into the GeNCs deposited onto the lithium foil. The reaction was stopped after 15 minutes. The resultant product was a viscous dark purple-black paste comprised of electrolyte and lithiated GeNCs. The paste can then be mixed with a binder or conductive carbon additive and be deposited onto a conductive substrate for use as a lithium-ion battery anode.

Example 5

Anode Construction Using bmimSCN with Electrolyte LiPF$_6$

Figure 11:
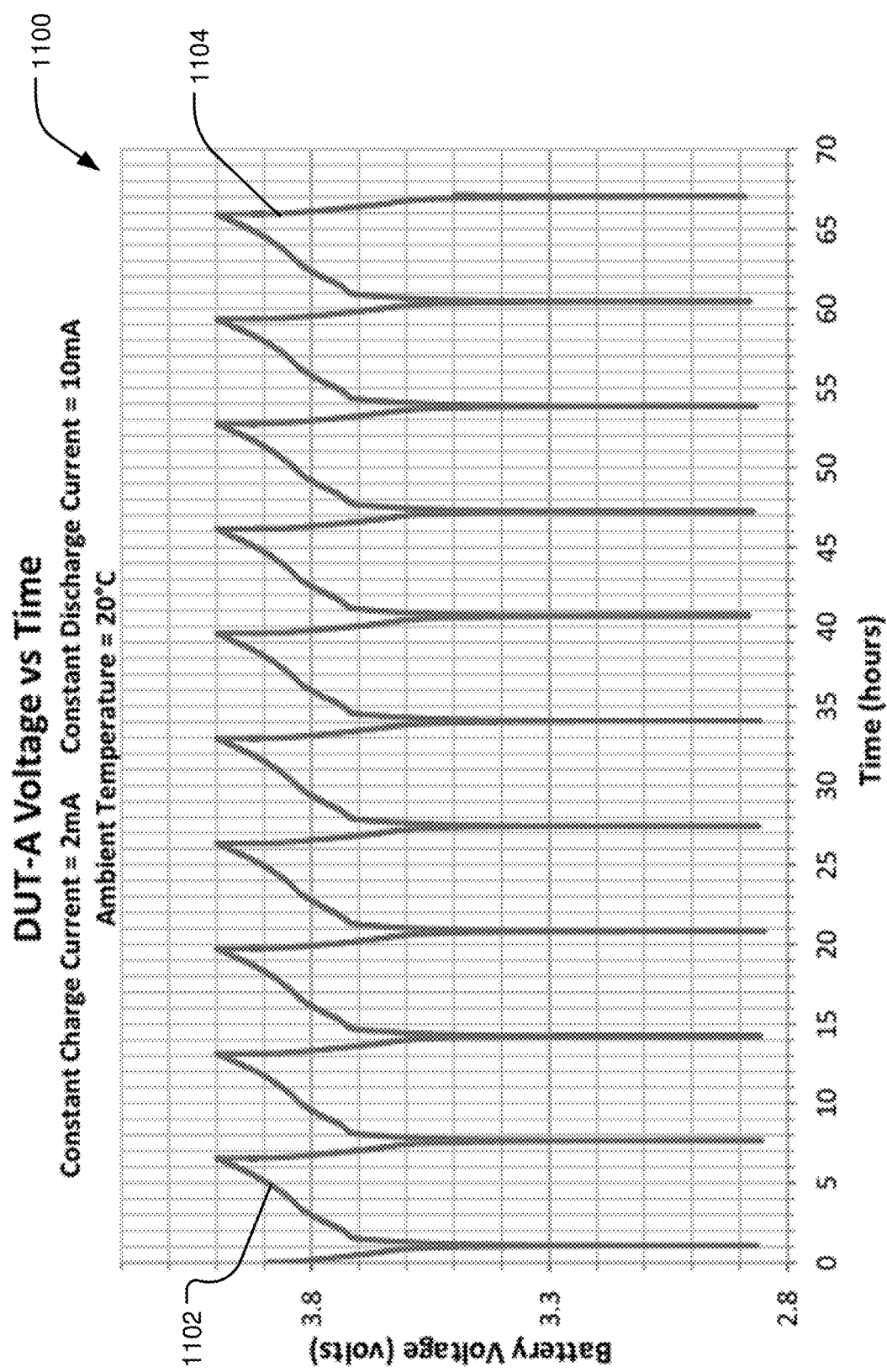
FIG. 11 is a graphic plot of sequential charge/discharge cycles of battery having a prelithiated germanium nanocrystal anode in units of voltage vs. time.

The process of Example 4 was altered to use 1-butyl-3-methylimidazolium thiocyanate (bmimSCN) as the ionic fluid in conjunction with lithium hexaflurophosphate (LiPF6). In other respects the apparatus, conditions, and techniques of Example 4 remained the same with the exception of a lower voltage of between 2V-4V held constant while the electrochemical reaction occurred. A dark brown to purple black paste comprised of electrolyte and lithium loaded GeNCs formed on the lithium electrode. An anode was formed with the paste and it was combined with a cathode electrode in a manner similar to Example 1 to form a cell. FIG. 11 depicts a series of discharge/recharge cycles 1100 for this exemplary cell. The cell was tested for energy capacity and volumetric energy density according to standard Li-ion battery testing protocol. Each charge cycle 1102 had a charge rate of C/10 and a discharge rate of 10. The cell had a 98% Coulomb efficiency, i.e., each discharge cycle 1104 was consistently 98% of energy that was put in for the charge.

Example 6

Half-Cell Anode Constructed from Lithiated Nanocrystal Material

Germanium nanocrystals were mixed into a slurry with poly acrylic acid binder (PAA)-450, Super-P Li conductive additive (Timcal), and N-Methyl-pyrollidone. The ratio of Li—GeNC to conductive carbon to binder was 40:40:20. The mixture was bath sonicated for 15 minutes and then spread with a doctor blade onto a copper foil current collector. The slurry coated copper electrode was then placed in an oven at 60° C. to evaporate the solvent (N-Methyl-2-pyrollidone). After drying, the coated copper electrode was calendered (roll pressed) to achieve a film thickness of 10 µm. Discs with a diameter of 11 mm were punched out of the paste coated copper electrode for half-cell assembly. The resulting mass loading was measured to be 2.98 mg/cm2 of Li—GeNC.

Figure 12:
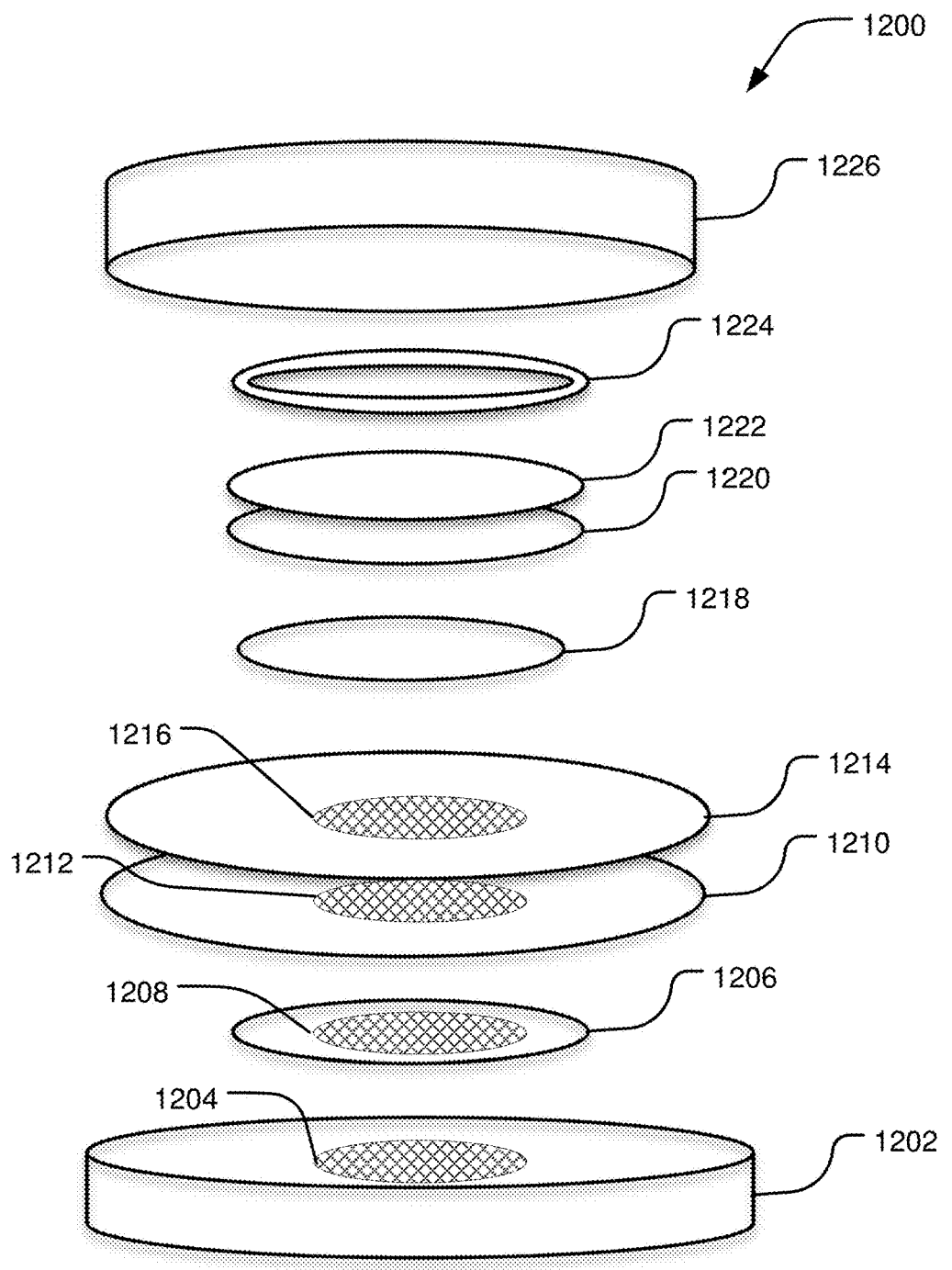
FIG. 12 is a schematic diagram in an exploded view of a half-cell incorporating a high energy capacity lithium-intercalated germanium nanocrystal anode.
Figure 13:
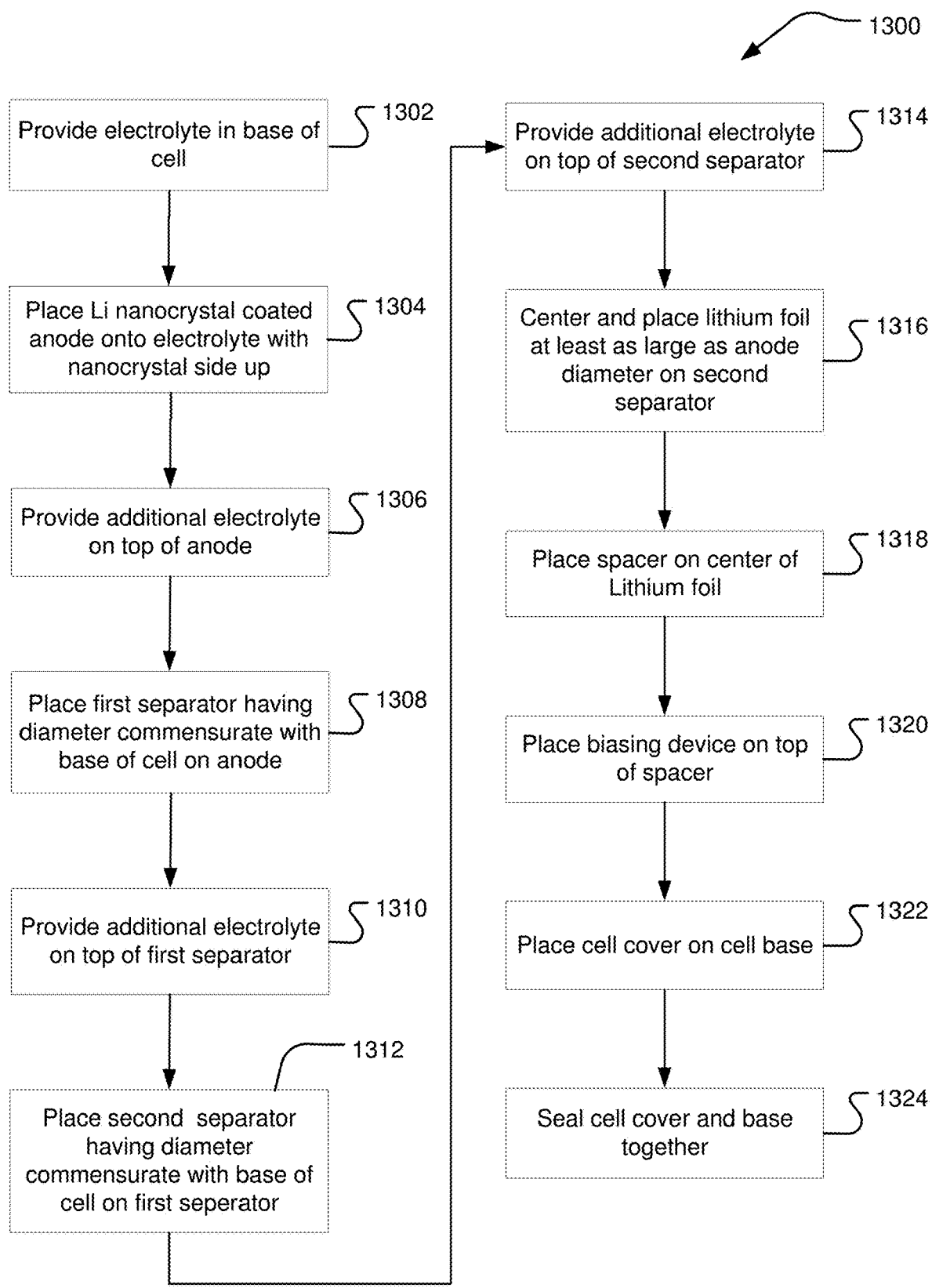
FIG. 13 is a flow diagram of a process for manufacturing a half-cell incorporating a high energy capacity lithium-intercalated germanium nanocrystal anode.

The half-cell was assembled in an argon filled glove box using a 2032 stainless steel coin cell with a negative base and positive cap. A schematic diagram of the components of the half-cell anode 1200 in an exploded view is depicted in FIG. 12 and a method 1300 for assembling the half-cell is presented in FIG. 13. Initially, 25 µL of electrolyte 1204 is deposited at the center of the cell case base 1202 as indicated in step 1302. In this example, the electrolyte is 1M LiPF6 in fluoroethylene carbonate (FEC) (both from Aldrich) (<0.1 ppm O2). Next, the Cu/Li—GeNC anode 1206 is placed onto the electrolyte droplet 1204 in the center of the base 1202 with the anode Li—GeNC paste-coated side up and Cu side down as indicated in step 1304. Another 25 µL of electrolyte 1208 is then added to the center of the anode 1206 as indicated in step 1306. A 19 mm diameter polypropylene separator 1210 (e.g., Celgard 2500 membrane separator at 25 µm thickness), sized to cover the entire cell base 1202, was placed onto the anode 1206 as indicated in step 1308. Another 25 µL of electrolyte 1212 was then deposited on the center of the separator 1210 as indicated in step 1310. A second polypropylene separator 1214 (also commensurate in size with the cell base 1202) was placed onto the first separator 1210 over the electrolyte 1212 as indicated in step 1312. A further 25 µL of electrolyte 1216 was then added to the center of the second separator 1314.

A lithium foil disk 1218 of at least the same diameter as the anode 1206 was placed onto the center of the second separator 1214 to act as a counter/reference electrode as indicated in step 1316. A stack of two stainless steel spacers 1220, 1222 centered on the cell base 1202 were placed onto the lithium foil disk 1218 as indicated in step 1318. A biasing device such as a spring washer 1224 was placed onto the spacer stack 1220, 1222 as indicated in step 1320. The cell cap 1226 is then placed over the spring washer 1224 as indicated in step 1322 and the cell cap 1226 and cell base 1202 are compressed together to encase the other components of the cell stack as indicated in step 1324. (Any excess electrolyte forced out when cell is compressed may be wiped off.) The cell cap 1226 and cell base 1202 may then be sealed together as indicated in step 1326, for example, by placing the half-cell 1200 in a crimping tool with the cell base 1202 oriented downward and crimping and removing any excess fluid after crimping. The half-cell anode 1200 may be used to make a full coin cell as described in further detail below with respect to FIGS. 15 and 16.

Figure 14:
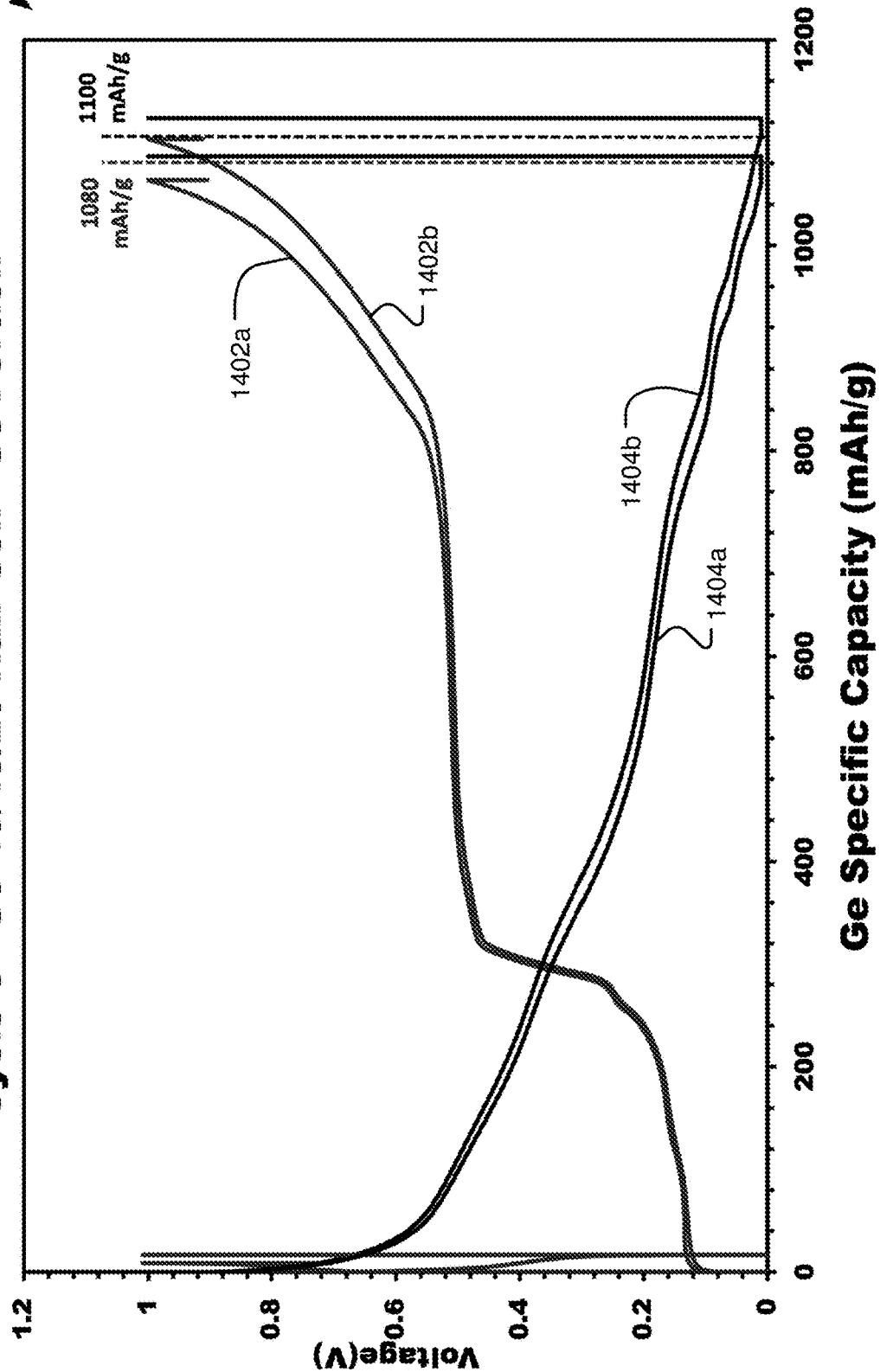
FIG. 14 is a graphic plot of sequential charge/discharge cycles of a prelithiated germanium nanocrystal anode half-cell.

Once the half-cell 1200 was completed, an initial conditioning cycle of C/20 using 1C=1180 mAh/g and constant current for charge-discharge was run between 0.01 V and 1V vs. Li/Li+. Subsequent cycles were carried out at a rate of 10. FIG. 14 shows a graph 1400 of two sequential charge cycles 1402*a/b* and related discharge cycles 1404*a/b* for the GeNC anode half-cell 1200 of Example 6. Each of the charge cycles 1402*a/b* reaches a specific energy capacity of about 1080 mAh/g from an original capacity of 1100 mAh/g after multiple recharge cycles, thus indicating no breakdown in the charge capacity of the anode as the nanocrystals expand and contract with lithiation and delithiation.

Example 7

Anode Cycle Testing

A plurality of samples were prepared by electrodepositing GeNC on to glass coated with indium tin oxide. Using an Agilent Technologies 4155C Semiconductor Parameter Analyzer and two Alessi needle probes in contact with the sample, I-V curves were obtained, and $V_{OC}$ values of about 7 to about 14 were measured. Further, the charge-discharge rates observed were comparable to other technologies like bulk silicon or germanium.

Batteries and Similar Devices Comprising the Disclosed Cathodes and Anodes

In some embodiments, batteries and similar devices described herein may comprise an anode described herein that comprises the nanocrystals described herein; a cathode; a separator disposed between the cathode and the anode; and an electrolyte. One skilled in the art with the benefit of this disclosure should understand the plurality of configurations for such components to achieve a desired the battery and similar device. Examples of similar devices may include, but are not limited to, super-capacitors, ultra-capacitors, dual in-line package batteries, flex batteries, large-format batteries, and the like.

Examples of cathode materials may, in some embodiments, include, but are not limited to, lithium cobalt oxide, lithium nickel oxide, lithium manganese oxide, lithium iron phosphate, lithium cobalt nickel manganese oxide, polypyrrole, polyaniline, and the like, and any combination thereof.

Examples of separators may, in some embodiments, include, but are not limited to, polyolefin-based separators, fluorinated polyolefin-based separators, fluorine resin based separators (e.g., polyethylene separators), polypropylene separators, polyvinylidene fluoride separators, VDF-HFP copolymer separators, polyethylene/polypropylene bilayer separators, polypropylene/polyethylene/polypropylene triple layer separators, polyethylene/polypropylene/polyethylene triple layer separators, and the like, any hybrid thereof, and any combination thereof.

In some embodiments, the electrolyte of the half-cells, batteries, and similar devices described herein may be a traditional electrolyte, e.g., a lithium salt in a non-aqueous solvent optionally with a polymer or a solid electrolyte. Examples of lithium salts may include, but are not limited to, fluorine-containing inorganic lithium salts (e.g., lithium bis(trifluoromethanesulfonyl)imide (LiTFSI), LiPF$_6$, and LiBF$_4$), chlorine-containing inorganic lithium salts (e.g., LiClO$_4$), fluorine-containing organic lithium salts (e.g., LiN(CF$_3$SO$_2$)$_2$, LiN(C$_2$F$_5$SO$_2$)$_2$, LiCF$_3$SO$_3$, LiC(CF$_3$SO$_2$)$_3$, LiPF$_4$(CF$_3$)$_2$, LiPF$_4$(C$_2$F$_5$)$_2$, LiPF$_4$(CF$_4$SO$_2$)$_2$, LiPF$_4$(C$_2$F$_5$SO$_2$)$_2$, LiBF$_2$(CF$_3$)$_2$, LiBF$_2$(C$_2$F$_5$)$_2$, LiBF$_2$(CF$_3$SO$_2$)$_2$, and LiBF$_2$(C$_2$F$_5$SO$_2$)$_2$), and the like, and any combination thereof. Examples of non-aqueous solvents may, in some embodiments, include, but are not limited to, 1-butyl-3-methylimidazolium thiocyanate (bmimSCN), N-butyl-N-methylpyrrolidinium bis(trifluoromethanesulfonyl)imide (Pyr14TFSI), cyclic carbonates (e.g., ethylene carbonate and propylene carbonate), linear carbonates (e.g., dimethyl carbonate and ethylmethyl carbonate), cyclic carboxylic acid esters (e.g., γ-butyrolactone and γ-valerolactone), and the like, and any combination thereof. Examples of solid electrolytes may include, but are not limited to, polyethylene oxide (PEO), polyacrylnitrile (PAN), or polymethylmethacrylate (PMMA), and the like, and any combination thereof. Examples of solid electrolytes (also known as fast ion conductors) may, in some embodiments, include, but are not limited to, lithium nitride, lithium iodide, lithium phosphate, and the like, and any combination thereof.

In some embodiments, the use of the nanocrystals described herein may enable the production of batteries and similar devices that can be cycled (i.e., charged and discharged) a plurality of times (e.g., about 500 times or greater) with minimal power density loss.

In some embodiments, the use of the nanocrystals described herein may enable the production of batteries and similar devices that have a tailorable open circuit voltage ($V_{OC}$), which may range from about 0.1 V to about 18 V including any subset therebetween. The $V_{OC}$ of the device may depend on, inter alia, the morphology and composition of the nanocrystals. Advantageously the $V_{OC}$ values that can be achieved be advantageous in producing higher voltage devices as bulk silicon and germanium have $V_{OC}$ levels on the order of about 0.4 V to about 1.1 V.

Example 8

Battery Cell with Li—GeNC Anode

A battery prototype was produced using an anode comprising Li—GeNCs. The anode measured an energy density per area of about 7.67 mWh/cm$^2$ and a capacity per area of about 2.32 mAh/cm$^2$, which were used to derive the anode energy density of about 38,350 Wh/L, an anode specific energy of 13,456 Wh/kg, and an anode specific capacity of about 3,684 Ah/kg. Further, upon several charge-discharge cycles (greater than 20), the battery showed no measurable degradation in performance. Such a battery has been charged and retained the charge for two to three weeks with no measureable loss of charge.

Example 9

Battery Cell with Li—SiGeNC Anode

Another battery prototype was produced using an anode comprising lithium stored in SiGeNCs. The anode measured an energy density per area of about 3 mAh/cm$^2$. Further, upon several charge-discharge cycles (greater than 20), the battery showed no measurable degradation in performance. Such a battery has been charged and retained the charge for two to three weeks with no measureable loss of charge.

Example 10

Full Coin Cell Battery with Li—SiGeNC Anode and S-C Nanotube Cathode

Figure 15:
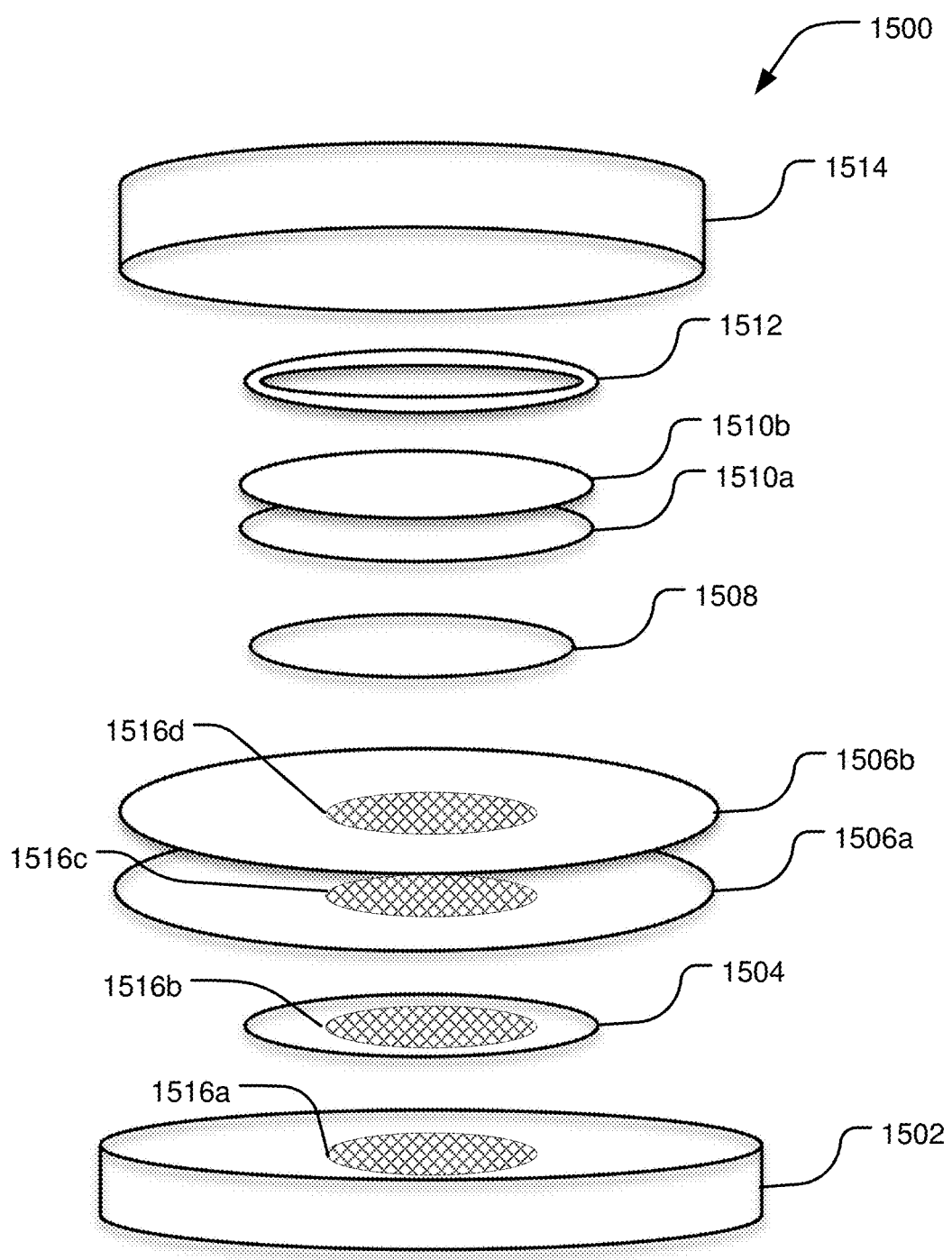
FIG. 15 is a schematic diagram of a battery cell incorporating a sulfur charged carbon nanotube cathode and a high energy capacity lithium-intercalated germanium nanocrystal anode.
Figure 16:
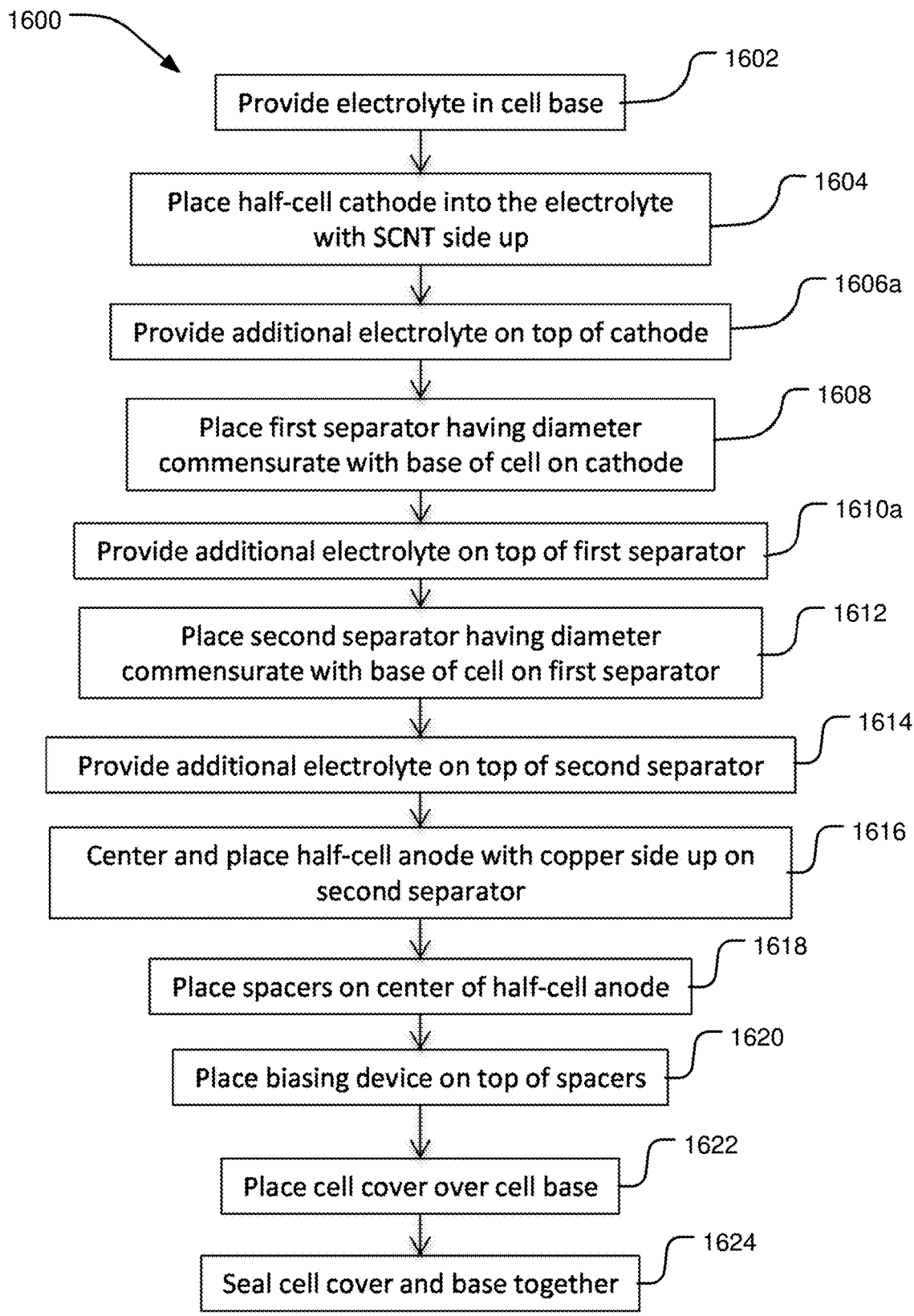
FIG. 16 is a flow diagram of a process for manufacturing a battery cell incorporating a sulfur charged carbon nanotube cathode and a high energy capacity lithium-intercalated germanium nanocrystal anode.

FIG. 15 is a schematic view of full coin cell, generally designated 1500. FIG. 16 is a method, generally designated 1600 for assembling a full coin cell in accordance with the embodiment of FIG. 15. The full coin cell may include a cell base 1502, a half-cell cathode 1504, one or more separators 1506a/b, a half-cell anode 1508, one or more spacers 1510a/b, a biasing device 1512, and a cell cover 1514.

In step 1602, an electrolyte 1516a is provided to the cell base 1502. The electrolyte 1516a may be, for example, 0.25E$^{-3}$ mol g$^{-1}$ of LiNO$_3$ (LiNO$_3$=68.95 g mol$^{-1}$), 0.25E$^{-3}$ mol g$^{-1}$ of DEMMOX (DEMMOX=466.4 g mol$^{-1}$), and a 1:1 (wt.) mixture of DME and DOL. In one embodiment, 25 μL of the electrolyte 1516a is provided to the center of the cell base 1502. In step 1604, the half-cell cathode 1504 is placed into the electrolyte 1516a. In various embodiments, the half-cell cathode 1504 includes a sulfur charged carbon nanotube cathode as described above with respect to FIGS. 1-6. In various embodiments, the cathode 1504 is placed with the aluminum contact of the cathode 1504 toward the cell base 1502 and the sulfur charged carbon nanotube coated side away from the cell base 1502. In step 1606, additional electrolyte 1516b is provided on top of the half-cell cathode 1504. In one embodiment 25 μL of the electrolyte 1516b is provided on top of the half-cell cathode 1504.

In step 1608, a first separator 1506a is placed on top of the electrolyte solution and the cathode 1504. In various embodiments, the first separator 1506a may have a diameter commensurate with the diameter of the cathode 1504. In certain embodiments, the first separator 1506a may be a 19 mm polypropylene separator. In step 1610, additional electrolyte 1516c is provided on top of the first separator 1506a. In one embodiment 25 μL of the electrolyte 1516c is provided on top of the first separator 1506a. In step 1612, a second separator 1506b is placed on top of the electrolyte solution 1516c and the first separator 1506a. In various embodiments, the second separator 1506b may have a diameter commensurate with the diameter of the first separator 1506a. In certain embodiments, the second separator 1506b may be a 19 mm polypropylene separator. In step 1614, additional electrolyte 1516d is provided on top of the second separator 1506b. In one embodiment 25 μL of the electrolyte 1516d is provided on top of the second separator 1506b.

In step 1616, a half-cell anode 1508, that is at least as large as the cathode diameter, is centered and placed on the electrolyte 1516*d* on the second separator 1506*b*. In various embodiments, the half-cell anode 1508 may completely cover the cathode 1504. In certain embodiments, the half-cell anode 1508 may be produced as described above with respect to FIGS. 12 and 13. In step 1618, the one or more spacers 1510*a/b* are placed on top of the half-cell anode 1508. In various embodiments, the spacers 1510*a/b* may be stainless steel spacers. In various embodiments, two spacers 1510*a/b* are placed on the half-cell anode 1508. In step 1620, the biasing device 1512 is placed on top of the spacers 1510*a/b*. In various embodiments, the biasing device 1512 may be a spring washer. In other embodiments, the biasing device 1512 may be any other type of biasing device that does not interfere with the electrical properties of the full coin cell 1500. In step 1622, the cell cover 1514 is placed over the cell base 1502 to enclose the contents of the full coin cell 1500. In various embodiments, enclosing the full coin cell 1500 may cause electrolyte to leak from the full coin cell 1500. Any electrolyte may be removed from the outside of the full coin cell 1500. In step 1624, the cell cover 1514 and the cell base 1502 are sealed together to create a complete full coin cell 1500.

The particular embodiments disclosed above are illustrative only, and may be modified and practiced in different but equivalent manners apparent in view of the teachings herein. Furthermore, no limitations to the details of construction or design herein shown are intended, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values.

The above specification, examples and data provide a complete description of the structures, methods, and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method for making sulfur charged carbon nanotubes comprising
    dissolving sublimed sulfur in an initial solvent to create a solution;
    adding carbon nanotubes to the solution, each having an exterior wall;
    adding a polar protic solvent to the solution; and
    removing the initial solvent from the solution to form the sulfur charged carbon nanotubes, wherein
        a first plurality of sulfur particles is contained within each sulfur charged carbon nanotube; and
        a second plurality of sulfur particles is directly pi-bonded to the exterior walls of the sulfur charged carbon nanotubes.

2. The method of claim 1, wherein the initial solvent comprises carbon disulfide.

3. The method of claim 1, wherein dissolving the sublimed sulfur in the initial solvent comprises at least one of sonicating the solution, stirring the solution, and heating the solution.

4. The method of claim 1, wherein removing the initial solvent comprises
    evaporating a first portion of the initial solvent by heating the solution; and
    removing a second portion of the initial solvent by air drying the solution.

5. The method of claim 1, wherein adding the carbon nanotubes comprises at least one of sonicating the solution, stirring the solution, and heating the solution.

6. The method of claim 1, wherein adding the polar protic solvent comprises drop-wise adding the polar protic solvent at a controlled rate.

7. The method of claim 1, wherein at least a portion of the sublimed sulfur fills the plurality of carbon nanotubes by nanocapillary action.

8. The method of claim 1, where the addition of the polar protic solvent results in a substantially uniform size distribution of the first and second pluralities of sulfur particles.

9. The method of claim 1, wherein the step of dissolving sublimed sulfur in the initial solvent occurs at a temperature of 32° C. to 33° C.

10. The method of claim 1, wherein the sublimed sulfur is about 50 to 98 percent of the final combined sulfur-nanotube mixture by weight.

11. The method of claim 1, wherein the carbon nanotubes are about 2 to 50 percent by weight of a combined mixture of the initial solution and the carbon nanotubes.

12. The method of claim 1, wherein the carbon nanotubes are double walled carbon nanotubes.

13. The method of claim 1, wherein the carbon nanotubes are less than about 5 micrometers in length.

14. The method of claim 5, wherein the solution is heated to 32° C. to 33° C.

* * * * *